(12) United States Patent
Almehmadi

(10) Patent No.: US 10,559,145 B1
(45) Date of Patent: Feb. 11, 2020

(54) SYSTEMS AND METHODS FOR PROVIDING BEHAVIORAL BASED INTENTION DETECTION

(71) Applicant: Abdulaziz Mohammed Almehmadi, Mississauga (CA)

(72) Inventor: Abdulaziz Mohammed Almehmadi, Mississauga (CA)

( * ) Notice: Subject to any disclaimer, the term of this patent is extended or adjusted under 35 U.S.C. 154(b) by 0 days.

(21) Appl. No.: 16/514,470

(22) Filed: Jul. 17, 2019

(51) Int. Cl.
  *G07C 9/00* (2006.01)
  *G06N 5/04* (2006.01)
  *G06F 3/01* (2006.01)

(52) U.S. Cl.
  CPC ......... *G07C 9/00134* (2013.01); *G06F 3/012* (2013.01); *G06N 5/047* (2013.01)

(58) Field of Classification Search
  CPC ............ G07C 9/00126; G07C 9/00134; G07C 9/00158; G06F 3/012; G06F 21/32; G06F 21/50; G06F 21/55; G06F 21/62; G06F 21/6245; G06F 2221/2103; G06F 2221/2113; G06N 5/047
  USPC ........................................................ 340/5.51
  See application file for complete search history.

(56) References Cited

U.S. PATENT DOCUMENTS

| 9,703,952 | B2 | 7/2017 | Almehmadi et al. | |
|---|---|---|---|---|
| 10,423,773 | B1* | 9/2019 | Huang | G06N 3/0454 |
| 2003/0191608 | A1* | 10/2003 | Anderson | G06F 11/328 |
| | | | | 702/189 |
| 2005/0022034 | A1* | 1/2005 | Chaudhari | G06F 21/32 |
| | | | | 726/19 |
| 2013/0300900 | A1* | 11/2013 | Pfister | G06K 9/00315 |
| | | | | 348/239 |
| 2015/0112606 | A1* | 4/2015 | He | A61B 5/0285 |
| | | | | 702/19 |

(Continued)

OTHER PUBLICATIONS

Almehmadi, A.; El-Khatib, K., "On the Possibility of Insider Threat Prevention Using Intent-Based Access Control (IBAC)", IEEE Systems Journal, Jun. 2017, vol. 11, Issue 2, pp. 373-384; DOI:10.1109/JSYST.2015.2424677.

(Continued)

*Primary Examiner* — Edwin C Holloway, III
(74) *Attorney, Agent, or Firm* — Norton Rose Fulbright Canada LLP

(57) ABSTRACT

Systems and methods for providing behavioral based intention detection. Based on behavioral measurements of a user associated with an access request to a protected resource, systems and methods are provided for generating an access decision indicating whether the user access request is accepted based on a determined potential intention of the user and a motivation score. The systems and methods may receive, from a movement detection sensor, stimulus-based micromovement data representing head micromovement upon the user being presented with a target stimulus associated with the potential intention and determine, based on the stimulus-based micromovement data, a stimulated frequency of the head micromovement pattern associated with the user being presented with the target stimulus. The systems and methods may determine whether the user has the potential intention based at least on a baseline frequency and the stimulated frequency of the head micromovement pattern.

20 Claims, 9 Drawing Sheets

(56) References Cited

U.S. PATENT DOCUMENTS

| | | | | |
|---|---|---|---|---|
| 2016/0004862 | A1* | 1/2016 | Almehmadi | G06F 21/552 726/25 |
| 2017/0119295 | A1* | 5/2017 | Twyman | A61B 3/112 |
| 2017/0340261 | A1* | 11/2017 | Torres | A61B 5/1101 |
| 2019/0065875 | A1* | 2/2019 | Sheikh Faridul | G06K 9/00208 |
| 2019/0171893 | A1* | 6/2019 | Gupta | G06K 9/00523 |

OTHER PUBLICATIONS

Cappelli, D.M.; Moore, A.P.; and Trzeciak, R.F., "The CERT Guide to Insider Threats: How to Prevent, Detect, and Respond to Information Technology Crimes (Theft, Sabotage, Fraud)", 1st Edition: Addison-Wesley Professional, Preface p. XX, Jan. 2012, Chapter 3, pp. 61-99.

Tuutti, C., "The Insider Threat: A Historical Perspective" Nextgov, Sep. 16, 2016, Available at: http://www.nextgov.com/cybersecurity/2016/09/insider-threat-historical-perspective/131613/.

Silowash, G.; Cappelli, D.M.; Moore A.P.; Trzeciak, R.F.; Shimeall, T.J.; Flynn, L., "Common Sense Guide to Mitigating Insider Threats, Fourth Edition", Software Engineering Institute, Carnegie Mellon University, Dec. 2012, https://resources.sei.cmu.edu/library/asset-view.cfm?assetID=34017.

PricewaterhouseCooper U.S., "As Cybercrime Threats Continue to Escalate, 2013 State of Cybercrime Survey from PwC and CSO Finds Companies Aren't Doing Enough to Defend Themselves", Available at "http://www.pwc.com/us/en/increasing-it-effectiveness/publications/us-state-of-cybercrime.jhtml", Jun. 20, 2013.

CERT Insider Threat Center. Available at: "http://www.cert.org/insider-threat/best-practices/index.cfm", accessed Jul. 15, 2019.

Middleton, R.D., "Privacy Impact Assessment Update for the Future Attribute Screening Technology (FAST)/Passive Methods for Precision Behavioral Screening", U.S. Homeland Security, Dec. 21, 2011, https://www.dhs.gov/sites/default/files/publications/Future%20Attribute%20Screening%20Technology-FAST.pdf.

Ferraiolo, D.F.; Kuhn, D.R., "Role-Based Access Control", 15th National Computer Security Conference, Baltimore, MD. Oct. 13-16, 1992, pp. 554-563.

Wang, J.; Takata, Y.; Seki, H. "HBAC: A Model for History-Based Access Control and Its Model Checking", Computer Security—ESORICS (Lecture Notes in Computer Science), Computer Science, vol. 4189. Springer, 2006.

Hur, J.; Noh, D.K., "Attribute-Based Access Control with Efficient Revocation in Data Outsourcing Systems", IEEE Transactions on Parallel and Distributed Systems, vol. 22, Issue: 7, Jul. 2011.

Ma, G.; Wu, K.; Zhang, T.; Li, W., "A flexible policy-based access control model for Workflow Management Systems", 2011 IEEE International Conference on Computer Science and Automation Engineering, Jun. 2011, pp. 533 to 537.

McGraw, R., "Risk-Adaptable Access Control (RAdAC)", Proc. Privilege Manage, Workshop, Sep. 2009, https://hvlpubs.nist.gov/nistpubs/Legacy/IR/nistir7665.pdf.

Almehmadi, A., El-Khatib, K., "Intention-based Trust Re-evaluation", Proc. 14th Annual Conference of Privacy, Security and Trust (PST), 2016, pp. 437-444, https://ieeexplore.ieee.org/abstract/document/7907006/.

McGraw, R., "Risk-Adaptable Access Control(RAdAC)", National Institution of Standards and Technology, Computer Security Division, Sep. 2009, https://csrc.nist.gov/news_events/privilege-management-workshop/radac-Paper0001.pdf.

Sheppard, B.H.; Hartwick, J.; Warshaw, P.R., "The Theory of Reasoned Action: A Meta-Analysis of Past Research with Recommendations for Modifications and Future Research", Journal of Consumer Research, vol. 15, No. 3, pp. 325-343, Dec. 1988.

Fogg, BJ, "A Behavior Model for Persuasive Design", Proceedings of the 4th International Conference on Persuasive Technology, Article No. 40, USA—Apr. 26-29, 2009.

Dobson, M.S.; Dobson D.S., "Chapter 4—Tools for Qualitative Risk Analysis". Project Risk and Cost Analysis, p. 92, AMACOM, 2012, Books24x7.

Goodpasture, John. "Chapter 8—Special Topics in Quantitative Management", Quantitative Methods in Project Management, pp. 229 and 230, J. Ross Publishing, 2004. Books24x7.

Williams, G., Office of Government Commerce (OGC), The, "Appendix B—Common Techniques", Management of Risk: Guidance for Practitioners. TSO, Ltd. © 2010. Books24x7.

Burgoon, J.K., "A Communication Model of Personal Space Violations: Explication and an Initial Test ," Human Communication Research, vol. 4, No. 2, pp. 129-142, Dec. 1978.

Wikipedia Article, "Detection Theory", citing Swets, J.A., Green D. M., Signal Detection Theory and Psychophysics: New York: Wiley, 1966.

Zolfagharifar, E., "Scared Stiff: Scientists discover how the brain sends signals to make us 'freeze' when faced with danger", DailyMail, Apr. 2014, Available at: http://www.dailymail.co.uk/sciencetech/article-2612117/Scared-stiff-Scientists-discover-brain-sends-signals-make-freeze-faced-danger.html.

Várszegi, K. "Comparison of Algorithms for Detecting Hand Movement from EEG signals," 2016 IEEE International Conference on Systems, Man, and Cybernetics, Oct. 9-12, 2016, Budapest, Hungary.

Noguchi, K., Somwong, P., Matsubara, T., "Human intention detection and activity support system for ubiquitous autonomy", Proceedings 2003 IEEE International Symposium on Computational Intelligence in Robotics and Automation, pp. 906-911, Jul. 16-20, 2003, Kobe, Japan.

Kirsch, R.F., and Au, A. "EMG-based motion intention detection for control of a shoulder neuroprosthesis", Proceedings—19th International Conference—IEEE/EMBS, Oct. 30 to Nov. 2, 1997, pp. 1944-1945.

Lew, E., Chavarriaga, R., Zhang, H., Seeck, M., and Millan, J., "Self-paced movement intention detection from human brain signals: Invasive and non-invasive EEG", 34th Annual Conference of the IEEE EMBS, Aug. 28 to Sep. 1, 2012, pp. 3280-3283.

Nakauchi, Y., Nogichi, K., Somwang, P., and Matsubara, T., "Vivid Room: Human Intention Detection and Activity Support System for Ubiquitous Autonomy" Proceedings of the 2003 IEEE/RSJ International Conference on Intelligent Robots and Systems, Oct. 2003, pp. 773-778.

Nemesysco Voice Analysis Technology, Nemesysco's Layered Voice Analysis (LVA), Accessed May 12, 2018, available at http://nemesysco.com/speech-analysis-technology.

Elkins, A., Burgoon, J., and Nunamaker, J., "Vocal Analysis Software for Security Screening: Validity and Deception Detection Potential," Homeland Security Affairs, Supplement 4, Article 1, Apr. 2012, http://www.hsaj.org/?special:fullarticle=0.4.1.

Burgoon, J., Adkins, M., Kruse, J., Jensen, M., Meservy, T., Twitchell, D., Deokar, A., and Nunamaker, J., "An Approach for Intent Identification by Building on Deception Detection", Proceedings of the 38th Annual Hawaii International Conference on System Sciences, Jan. 2005.

Chen, H., Chung, W., Qin, J., Reid, E., Sageman, M., Weimann, G., "Uncovering the dark Web: A case study of Jihad on the Web" in Journal of the American Society for Information Science and Technology, vol. 59 Issue 8, Jun. 2008, pp. 1347-1359.

Raghu, T., Chen, H., "Cyberinfrastructure for homeland security: Advances in information sharing, data mining, and collaboration systems", Decision Support Systems, vol. 43, No. 4, pp. 1321-1323, 2007.

Memon N., Hu, J., Hicks, D., Chen, H., "Social Network Data Mining: Research Questions, Techniques, and Applications", Data Mining for Social Network Data, vol. 12, 2010, pp. 1-7.

Memon, N., Larsen, H., Hicks, D. and Harkiolakis, N., "Retracted: Detecting Hidden Hierarchy in Terrorist Networks: Some Case Studies", Intelligence and Security Informatics, Springer, pp. 477-488, 2008.

Vybornova, O., Smirnov, I., Sochenkov, I., Kiselyov, A., Tikhomirov, I., Chudova, N., Kuznetsova, Y., Osipov, G., "Social Tension Detection and Intention Recognition Using Natural Language Semantic Analysis: On the Material of Russian-Speaking Social Networks

(56) References Cited

OTHER PUBLICATIONS and Web Forums," 2011 European Intelligence and Security Informatics Conference (EISIC), Sep. 2011, pp. 277-281.
S. Dong, S. Lee, "Understanding human implicit intention based on frontal electroencephalography (EEG)," IEEE World Congress on Computational Intelligence, Jun. 10-15, 2012, pp. 1-5.
J. Rosenfeld, X. Hu, E Labkovsky, E. Meixner, and M. Winograd, "Review of recent studies and issues regarding the P300-based complex trial protocol for detection of concealed information," International Journal of Psychophysiology, vol. 90, issue 2, Nov. 2013, pp. 118-134.
J. Meixner and P. Rosenfeld, "A mock terrorism application of the P300-based concealed information test", Psychophysiology, vol. 48, issue 2, pp. 149-154, Feb. 2011.
Holten, R., "Willing, Wanting, Waiting," Chapter 2, Oxford UP, 2009, http://web.mit.edu/holton/www/pubs/bookpdf.
Seltzer, L., "Trauma and the Freeze Response: Good, Bad, or Both?", Psychology Today, Jul. 8, 2015, https://www.psychologytoday.com/blog/evolution-the-self/201507/trauma-and-the-freeze-response-good-bad-or-both.
HyperCam, accessed Jul. 15, 2019, http://hypercam.en.softonic.com/.
Martinovic, I., Davies, D., Frank, M., Perito, D., Ros, T., and Song, D., "On the feasibility of side-channel attacks with brain-computer interfaces," In Proceedings of the 21st USENIX conference on Security symposium (Security), USENIX Association, Berkeley, CA, 2012, pp. 1-16.
Almehmadi, A., "Micromovement Behavior as an Intention Detection Measurement for Preventing Insider Threats", IEEE Access, vol. 6, pp. 40626-40637, Jul. 18, 2018.

\* cited by examiner

SYSTEMS AND METHODS FOR PROVIDING BEHAVIORAL BASED INTENTION DETECTION

FIELD

Embodiments of the present disclosure generally relate to the field of user intention detection and, in particular, to systems and methods for providing behavioral based intention detection.

BACKGROUND

User access control may be applied to physical resources, electronic resources, virtual resources, or the like. Access control may include one or a combination of authentication methods and authorization methods. Authentication methods may be used for determining or verifying a user's identity. Authorization methods may be based on permission assignments that may grant an identified user access to some resources and may deny user access to other resources. Although available authentication or authorization methods may provide access control based on recognized user identity, providing access to a protected resource based on recognized user identity may not guarantee that the authenticated or authorized user will not conduct unintended activity associated with the protected resource.

SUMMARY

Physiological and behavioral variations among individuals leads to difficult technical problems when conducting user-intention risk analysis. These technical problems are especially challenging when interpretation of physiological and behavioral data points based on evaluator/evaluatee question and answer interactions are based on subjective judgment of the evaluator. Some systems and methods of user intention detection are based on physiological measurements, such as electrical signal measurements of a user's brain (e.g., electroencephalogram (EEG)). Specialized test facilities or environments and specialized sensor placement can be required for collecting physiological data from an individual under test.

Thus, there are challenging technical problems associated with collecting and analyzing physiological signals of a target individual user test. For example, systems for collecting physiological signals of the target individual user may require onerous or invasive placement of specialized sensors on the target user and may detract from identifying a natural reaction of the target user upon being presented with a target stimuli (where the target stimuli may be associated with a potential user intention). Further, systems and methods for deducing user intentions based on measured physiological signals can require complex or computationally intensive processing of the measured physiological signals.

Improved systems and methods of providing behavioral based intention detection are described herein. The systems and methods described herein conduct operations based on the scientific approach that self-knowledge existence about a user intention before actions associated with that intention is correlated with involuntary micromovements, such as head micromovements. Head micromovements may include a sequence of small involuntary movements with high frequency (e.g., 1,000 involuntary movements per second). Head micromovements (or micromovements of other portions of an individual's body) are not easily detectable by an un-aided eye of a human. Thus, detecting changes in such involuntary micromovements of an individual under test cannot practically be performed in the human mind, at least, because detection of such involuntary micromovements requires movement detection sensors operating at relatively high sampling rates, such as 128 samples per second or greater.

The operations described herein analyze head micromovement characteristics, such as micromovement patterns, frequency of micromovement patterns, or the like, when an individual user under test is exposed to one or more target stimuli and determine a potential intention of the user based on analysis of the head micromovement characteristics. Micromovement patterns may be a sequence of repeated micromovements and, in some embodiments described herein, the operations conduct operations based on empirical findings that characteristics of one or more head micromovement patterns are correlated: (1) with likelihood indications that a user has a potential intention associated with a presented target stimulus; and (2) with likelihood indications that the user will conduct an action correlated with the identified potential intention. For example, embodiments described herein are based on the scientific approach that analyzing a head micromovement pattern of "up-down-down-up" of an individual under evaluation both before (e.g., baseline data) and after (stimulus-based data) presenting a target stimulus can provide indications on whether a user has a potential intention associated with the presented target stimulus and what the likelihood is of that user conducting the action correlated with the identified potential indication.

Target stimulus can be selected based on an association with potential intentions and associated actions. For example, visual images of a burning science laboratory can be associated with a user's intention to cause damage to a school building. In some examples, olfactory stimulus, such as olfactory output mimicking distinctive food, can be associated with a user's intention to purchase that food. Examples of target stimulus can be in visual form, acoustic form, olfactory form, tactile form, or chemical form.

The systems described herein collect micromovement data associated with involuntary micromovements of individuals and additionally analyze the combination of micromovement data (e.g., micromovement data associated with target stimulus and non-target stimulus) representing behavioral characteristics based on both absolute and relative relationships between collected micromovement data. For example, the systems and methods conduct operations that analyze magnitudes of behavioral measurement data points (e.g., identifying signal peaks or maximums) and also analyze relative magnitudes of behavioral measurement data points, as a combined analysis. The systems and methods described herein can determine that the user presented with a target stimulus has a potential intention associated with that target stimulus when a stimulated frequency of head micromovement pattern(s) (e.g., upon being presented with the target stimulus) is lower than a baseline frequency of head micromovement pattern(s) (e.g., upon being presented with a non-target stimulus or no particular stimulus). Thus, the systems and methods described herein can evaluate changes in micromovement patterns to deduce or determine intentions of the individual under test.

In some embodiments, the systems and methods conduct operations to identify a likelihood or degree of motivation for the individual to conduct actions associated with the identified potential intention. The motivation may be a motivation score quantified as proportional to a difference between the stimulated frequency and the baseline frequency of the head micromovement pattern. In some examples, the greater the difference between the above-described stimulated frequency and the baseline frequency of the head micromovement pattern, the greater the likelihood that the individual may conduct the action associated with the identified intention. The operations can be based on a scientific approach that the individual may be most adept to changes of involuntary micromovement behavior (e.g., exhibit a "fight, flight, and freeze" response) when being presented with a target stimulus corresponding to their intention.

Accordingly, some embodiments disclosed herein may provide systems and methods of intent-based access control based on analyzing micromovements of a user upon presentation of a target stimuli to that user. The target stimuli may be associated with a particular action. In some examples, the particular action may be ill-intended, unintended, or simply an action that may be desirable to track.

In one aspect, the present application provides a system for intent-based access control. The system may comprise a movement detection sensor; a processor coupled to the movement detection sensor; and a memory coupled to the processor storing processor-executable instructions that, when executed, may configure the processor to: receive a user access request to a protected resource; receive, from the movement detection sensor, initial micromovement data representing head micromovement of a user associated with the user access request; determine, based on the initial micromovement data, a baseline frequency of a head micromovement pattern, the head micromovement pattern including a sequence of involuntary head micromovements of the user associated with the user access request; receive, from the movement detection sensor, stimulus-based micromovement data representing head micromovement upon the user being presented with a target stimulus associated with a potential intention; determine, based on the stimulus-based micromovement data, a stimulated frequency of the head micromovement pattern associated with the user being presented with the target stimulus; determine that the user presented with the target stimulus has the potential intention based at least on the baseline frequency and the stimulated frequency of the head micromovement pattern; determine a motivation score associated with the determined potential intention of the user based on the stimulated frequency relative to the baseline frequency of the head micromovement pattern, the motivation score indicating a likelihood that the user executes the potential intention; and generate a signal representing an access decision indicating whether the user access request is accepted based on the potential intention of the user and the motivation score, the signal representing the access decision for transmission to a protected resource controller.

In an embodiment, the sequence of involuntary head micromovements of the user associated with the user access request may include a sequence of up-down-down-up movements detected about a y-axis of the movement detection sensor.

In an embodiment, the user presented with the target stimulus may have the potential intention when the stimulated frequency of the head micromovement pattern is lower than the baseline frequency of the head micromovement pattern by a threshold value.

In an embodiment, the motivation score may be associated with a likelihood of the potential intention associated with the target stimulus being undertaken by the user associated with the access request. The motivation score may be quantified as proportional to a difference between the stimulated frequency and the baseline frequency of the head micromovement pattern.

In an embodiment, the baseline frequency of the head micromovement pattern may be associated with the user being presented with a non-target stimulus.

In an embodiment, the movement detection sensor may include at least one of a gyroscope, a laser distance measurement device, or a wave-detecting device, and the movement detection sensor may be configured to detect movement at a rate of at least 128 samples per second.

In an embodiment, the movement detection sensor may include an image capture device to capture images for tracking the head micromovement.

In an embodiment, the target stimulus may include at least one of a visual, audible, and olfactory stimulus.

In an embodiment, the system may include a stimulus output device coupled to the processor. The stimulus output device may provide the target stimulus for presentation to the user associated with the access request.

In an embodiment, the processor-executable instructions, when executed, may configure the processor to filter the initial micromovement data and the stimulus-based micromovement data to identify micromovement data representing head micromovement patterns.

In another aspect, the present application provides a method of intent-based access control. The method may comprise: receiving a user access request to a protected resource; receiving, from a movement detection sensor, initial micromovement data representing head micromovement of a user associated with the user access request; determining, based on the initial micromovement data, a baseline frequency of a head micromovement pattern, the head micromovement pattern including a sequence of involuntary head micromovements of the user associated with the user access request; receiving, from the movement detection sensor, stimulus-based micromovement data representing head micromovement upon the user being presented with a target stimulus associated with a potential intention; determining, based on the stimulus-based micromovement data, a stimulated frequency of the head micromovement pattern associated with the user being presented with the target stimulus; determining that the user presented with the target stimulus has the potential intention based at least on the baseline frequency and the stimulated frequency of the head micromovement pattern; determining a motivation score associated with the determined potential intention of the user based on the stimulated frequency relative to the baseline frequency of the head micromovement pattern, the motivation score indicating a likelihood that the user executes the potential intention; and generating a signal representing an access decision indicating whether the user access request is accepted based on the potential intention of the user and the motivation score, the signal representing the access decision for transmission to a protected resource controller.

In an embodiment, the sequence of involuntary head micromovements of the user associated with the user access request may include a sequence of up-down-down-up movements detected about a y-axis of the movement detection sensor.

In an embodiment, the user presented with the target stimulus may have the potential intention when the stimulated frequency of the head micromovement pattern is lower than the baseline frequency of the head micromovement pattern by a threshold value.

In an embodiment, the motivation score may be associated with a likelihood of the potential intention associated with the target stimulus being undertaken by the user associated with the access request. The motivation score may be quantified as proportional to a difference between the stimulated frequency and the baseline frequency of the head micromovement pattern.

In an embodiment, the baseline frequency of the head micromovement pattern may be associated with the user being presented with a non-target stimulus.

In an embodiment, the movement detection sensor may include at least one of a gyroscope, a laser distance measurement device, or a wave-detecting device. The movement detection sensor may be configured to detect movement at a rate of at least 128 samples per second.

In an embodiment, the movement detection sensor includes an image capture device to capture images for tracking the head micromovement.

In an embodiment, the target stimulus may include at least one of a visual, audible, and olfactory stimulus.

In another aspect, a non-transitory computer-readable medium or media having stored thereon machine interpretable instructions which, when executed by a processor may cause the processor to perform the method of intent-based access control described herein.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the present disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
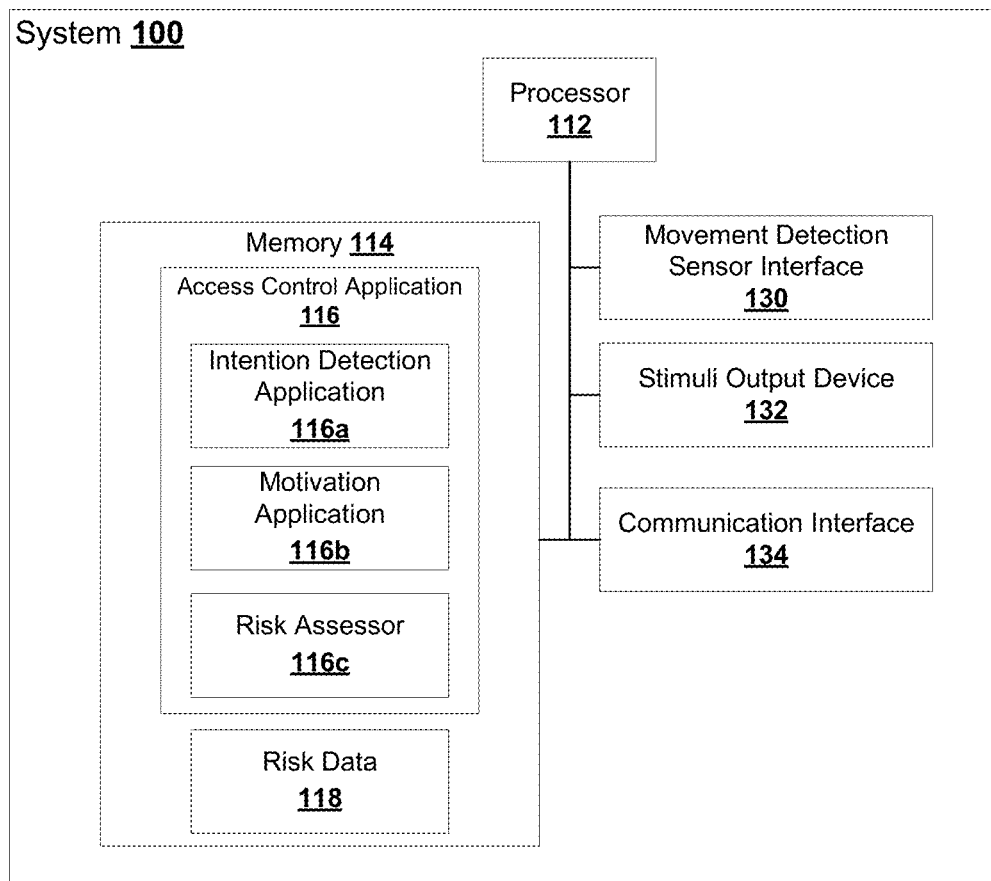
FIG. 1 illustrates a simplified block diagram of a system for intent-based access control, in accordance with an embodiment of the present application.

Protected resources described herein can include computer system resources, physical resources, data resources, or the like. In some examples, resources may be assets, such as currency, tokens, physical buildings, data, precious metals, computing devices, or other tangible or intangible assets that may be access controlled.

As an illustrating example, a protected resource may be an electronic computing device. In one embodiment, the electronic computing device may include identity-based access control based on username/password challenge and response questions. In some scenarios, even though a user may have a username/password for accessing the electronic computing device, the user may have potential intentions associated with unintended or ill-intended actions. For example, the user may exploit data stored on the electronic computing device, such as sharing confidential data with unauthorized persons, deleting confidential information, or the like. Accordingly, it may be desirable to provide systems and methods for providing risk-based access control, in addition to or in place of identity-based access control.

Systems and methods for providing risk-based access control may include systems of intention-based access control. For example, systems and methods of intention-based access control may be based on physiological measurements, such as electrical signal measurements of a user's brain, for deducing user intentions. However, there are challenging technical problems associated with collecting and analyzing physiological signals of a target user. For example, systems for collecting physiological signals of the target user may require onerous or invasive placement of specialized sensors on the target user and may detract from identifying a natural reaction of the target user upon being presented with a target stimuli (where the target stimuli may be associated with a potential user intention). Further, systems for deducing user intentions based on measured physiological signals can require complex or computationally intensive processing of the measured physiological signals.

Improved systems and methods of intent-based access control are described herein, where the systems and methods may determine whether a target user has a potential intention based on micromovement data representing micromovement of the user upon being presented with a target stimulus associated with the potential intention. As illustrated in various embodiments herein, measurement of micromovement data may be based on behavioral observations of the target user.

Head micromovements include sequences of small involuntary movements with high frequency. As an illustrating example, such small involuntary movements may be at a frequency of 1,000 movements per second; however, any other frequency may be contemplated. Because micromovements of humans may not be easily detectable by an unaided eye of a human, detecting changes in involuntary micromovements of an individual under test cannot practically be performed in the human mind, at least, because detection of such involuntary micromovements requires movement detection sensors operating at relatively high sampling rates (e.g., 128 samples per second or greater).

Embodiments described herein analyze head micromovement characteristics, such as micromovement patterns, frequency of micromovement patterns, or the like. Such head micromovement characteristics may change when an individual user under test is exposed to target stimulus. The systems and methods described herein are based on empirical findings that characteristics of one or more head micromovement patterns may be correlated: (1) with likelihood that a user has a potential intention associated with a presented target stimulus; and (2) with likelihood indications that the user will conduct an action correlated with the identified potential intention. It may be appreciated that embodiments conduct operations to analyze sequences of micromovements (e.g., identified patterns) that are found to be correlated with user intention and motivation indicators.

User intentions may be future plans. The user may possess knowledge about their intention. The systems and methods described herein may conduct operations on the foundation that self-knowledge existence about an intention before actions associated with the intention are undertaken may be correlated with involuntary head micromovements. When a user is presented with target stimuli associated with a possible intention, a number or frequency of the involuntary head micromovements of the user may change. Further, the systems and methods conduct operations to determine the likelihood of the potential intention being undertaken based on the foundation that as the likelihood of a user undertaking action associated with the potential intention becomes higher, the number or frequency of head micromovements decreases.

The systems and methods described herein include one or more movement detection sensors for providing observation-based intention detection for access control. In some embodiments, a potential intention of a user may be detected based on observation of user head micromovement patterns upon presentation of one or more visual stimuli to the user. Although examples described herein may detect head micromovements, in some embodiments, the systems and methods for intent-based access control may detect micromovements of other portions of a user's body.

Access control may be a set of policies and mechanisms that control access by entities to one or more protected resources. For example, access controls may include defined requirements associated with users to access protected resources. Access may be granted to the protected resources when such requirements are satisfied. Access controls may control who is permitted to access what resource(s), at what level or scope of access, how a user may access the resource(s), where the user may access the resource(s), and/or during what time period the user may access the resource(s), as defined by defined requirements. Access control mechanisms may safeguard systems and other protected resources from unauthorized access to prevent security breaches or misappropriation of protected resources.

Access control systems may include authentication and/or authorization. Authentication may include verifying or determining a user's identity. A user's identity that is determined/verified by a system may be cross-checked against permissions rules or requirements defined and managed by the access control system. Authorization mechanisms may be based on permission assignments for users. The output of authentication mechanisms may be used by authorization mechanisms to determine what permissions may be granted. The output may be an access approval or denial, which may result in the user gaining access to a protected resource according to defined access levels or being denied access to the protected resource. Other methods and types of user authentication may be contemplated.

User authentication methods may be based on: (a) "something you know", such as a password; (b) "something you have", such as a smart card, token, certificate, etc.; or (c) "something you are", based on biometrics or other physiological characteristic of the user. Authentication methods may be a first layer of protection against unauthorized access to protected resources. Other methods of protecting resources may include encryption for protecting secrecy of information. Although user authentication may be used for identifying users who may be authenticated and pre-authorized to access protected resources, misappropriation of protected resources may be conducted by authorized, trusted, and identifiable individuals, such as insiders of an organization.

Although the number of occurrences of misappropriation of protected resources by insider users may be low, the impact of misappropriation of protected resources by insider users may exceed the sum of the impact of numerous outsider threats, at least, because insider users may access relatively high value assets.

As will be described, in some embodiments, an Intent-based Access Control (IBAC) system [1] may detect intentions of users accessing a protected resource and the motivation that corresponds to the user intention. The motivation may correspond to a probability that the user may conduct actions based on the detected intention. The system may calculate a risk value for determining whether to grant or deny an authenticated user access to a protected resource. The IBAC model relies on measured physiological signals to detect intentions of access. In some examples, physiological signals may include Electroencephalogram (EEG) signals; however, other example physiological signals may be contemplated. It may be appreciated that measurement of physiological signals of a user associated with an access request to a protected resource may involve utilizing one or more sensors affixed to the user.

The Computer Emergency and Response Team (CERT) Insider Threats Center defines insider threats as "A malicious insider threat is a current or former employee, contractor, or business partner who has or had authorized access to an organization's network, system, or data and intentionally exceeded or misused that access in a manner that negatively affected the confidentiality, integrity, or availability of the organization's information or information systems" [2]. Insider threats include IT sabotage, fraud and theft of intellectual property. Insider threats are the most difficult threats to experience and the mitigation of the impact they pose is not easily done by traditional protocols. Although insider threats have been studied since early of the 1980s, the threat has been there since the beginning of humanity [3]. Today the threat of an insider has evolved and the impact has raised. Best practices are released periodically such as the Common Sense Guide to Mitigating Insider Threats [4], which provides the practices and standards companies need to implement to mitigate the insider threat. Yet still as per the 2013 State of Cybercrime Survey from PwC and CSO [5], the survey concludes that companies do not do enough to protect themselves. It states that insiders are more likely to cause damage to an organization than external attacks. 33% of companies who suffered the insider threat did not have an insider threat response plan even though it has been suggested as a best practice over a decade ago, since 2001 [6]. Companies need an automatic system that detects and prevents the insider threat that does not rely heavily on an overwhelming list of best practices. Automatic solutions to the insider threat include implementing and using security awareness programs, data loss prevention, segregation of duties, honeytokens and intrusion prevention systems. Those measures are the most used in organizations and the most suggested to be implemented, yet there still exist another two measurements that provide a better opportunity of preventing the insider threat: 1) Behavioral analysis and, 2) Physiological signals analysis.

Future Attribute Screening Technology (FAST) [7] is an access control system that relies heavily on behavioral and physiological signals to detect a malicious intention in the form of the prevention of pre-crime. FAST targets terrorism particularly. It requires users to pass through gates and reply to questions while their behavioral and physiological signals are analyzed. Physiological and behavioral signals include thermal imaging, ECG, respiration, eye movement and facial expressions. Limitations in the FAST approach include: 1) The need for a facility to test. 2) Not an automated approach. 3) Detection is in the form of an interview and therefore detection time is not user-friendly. 4) Low success rates. 5) Low user acceptability.

Current access control models including Discretionary Access Control (DAC) and Non-Discretionary access control fail to detect and prevent insider threats. DAC models, such as Capability-based and Access Control List (ACL-based), involve the decision of the object creator "Owner" to determine who can access the object and what level of access is permitted. DAC is an owner based access control that works in some deployments well enough, but may not be a robust choice to address the insider threat. Non-Discretionary access control models overcome the weaknesses in DAC models by allowing the access control decisions to be done from the operating system layer. Such model reduces the human error factor and makes the access control model efficient. Mandatory access control (MAC) are such as Rule-based and Lattice-based access control that provide access permissions based on a set of rules that are predefined in the system. The most used access control model by organizations is the Role-based Access Control (RBAC) [8] that sets permissions to entities based on their roles in the company. Other Non-discretionary access control models have been proposed such as History-based Access Control (HBAC) [9], Attribute-based Access Control (ABAC) [10], or Policy-based Access Control (PBAC) [11]. Most access control systems are static. Once a policy, attribute, role, etc. is added and its permissions have been assigned, permissions do not change unless a modification occurs. This imposes a risk of the insider threat as permissions do not get revoked and start to build in a way that it becomes unmanageable. The literature suggests the use of Non-Discretionary access control models as the decision becomes computerized.

However, dynamic access control models exist to complement the need of evolving and continuously changing structure of organizations. This is when Risk-Adaptive Access Control (RAdAC) [12] comes in place. RAdAC is a dynamic risk-based access control model that assesses the risk based on characteristics of people, characteristics of IT components, characteristics of objects, environmental factors, situational factors and heuristics. Each of the assessment components is a challenge by itself. The National Institute of Standards and Technology (NIST) represent the challenge of characteristics of people as "User Information—This is the source of any information RAdAC would need to assess the trustworthiness of the people involved in the access decision, such as identification and authentication information, and authorizations such as their security clearance. Since RAdAC will have to render access decisions for people that do not hold security clearances, other information will need to be available to use in the risk determination process to determine a level of risk associated with granting them access. What sort of information might be valuable to determining their trustworthiness? Could a mini background investigation be done online?" [12]. The IBAC model addresses the RAdAC requirement of human trustworthiness [13] and [14]; however, the IBAC model heavily relies on the physiological signals to detect intentions of access and then assesses the risk of access. The IBAC model shows 100% accuracy in preventing malicious insiders gain access to system resources [1]. However, the user acceptability of the current IBAC model reached only 10% specifically due to the nature of the physiological signal acquisition method, which requires a user to wear a cap that include 14 EEG sensors, and that the sensors require a saline solution. Accordingly, the present application describes systems and methods based on behavioral measurement operations in order to improve the user acceptance of intent-based access control systems.

IBAC is a risk-based, rather than an identity-based, access control model that measures risk based on the intention of access and the motivation levels. IBAC works based at least on three components: 1) Intent and Motivation Detection, 2) Risk Assessment, and 3) Access Decision.

The Intention and Motivation Detection (IMD) component receives input from sensors that are attached to the user's head. Once signals are obtained, they are filtered, classified, and analyzed to detect the intention and the level of that intention (motivation level).

IMD may identify an intention category that is detected from a set of possible intentions. Each intent category is assigned a value that influences the overall risk. The intent category value assignment may depend on the resources that the system is protecting and, as such, assigning the impact value of an intent is the organization's decision. IMD may return the motivation level which corresponds to the likelihood of an intent being executed. In some examples described herein, the proposed measurement for detecting intention and motivation may include micromovement behavior of a user, rather than EEG signals measured form the user.

The Risk Assessment (RA) component may define risk as the probability of a threat exploiting a vulnerability in an asset. The definition of risk may involve considering threat, vulnerability, and asset. In examples described herein, the threat and the vulnerability may exist. The threat is the insider threat, and the vulnerability is the abuse of privileges causing damage to assets [1].

The RA component provides an assessment of risk levels associated with the type of intention to exploit a vulnerability in an asset and the motivation level (Probability) with regard to the value of the asset that is protected. The RA component calculates a risk level and then passes the results to the Access Decision component [1].

Once an intention is detected, the intention category cost value that corresponds to the detected intention is assigned in the Intent Category (IntC), which is provided by the asset owner.

Because intentions are highly driven by the motivation level that accompanies the tested intention [15, 16], the motivation level, which is a factor that influences an individual to commit an intended action, is used to determine the probability of an intention being executed. An Intention Motivation (IntM) value is assigned an IntM value. The IntM value may be determined by the number of micro-movements, where a lower the number of movements may correspond to a higher the motivation towards the identified intention.

$$\text{Intention Motivation} \triangleq \frac{\text{Number of Micro} - \text{Movements}}{10}$$

In some examples, the number of micromovements may be divided by 10 as the Intent Motivation functions as a probability of an intent being executed and its value are between 0 and 1. The number of micromovements may be the difference between the number of micromovements when a user views stimuli that represent their intention and the number of micromovements when a user views stimuli that does not represent their intention. The number of micromovements when viewing stimuli that does not represent a user's intention serves as a baseline for the detected intention. The difference in the number of micromovements may be divided by 10 and reported as an Intention Motivation.

In example IBAC systems, the IntM value may be determined by physiological signal amplitude measurements. The IntM value may be computed as follows:

$$\text{Intention Motivation} \triangleq \text{Amplitude}(P300)[1]$$

P300 may be an EEG signal that occurs 300 ms after a user recognizes their intention when presenting visual stimuli.

The risk assessment theory [17, 18, 19] states that risk is equal to Loss×Probability of occurrence. The following equation may calculate the total risk level as defined by the risk assessment theory which states that risk is equal to the impact multiplied with the probability of impact. Since the impact in the insider threat context is the intention and the probability of the impact is the motivation level towards the intention the risk value may be calculated as follows.

Risk (R) is the total risk and is defined as:

$$R = \frac{\text{Motivation Level} * \text{Intention Category Value}}{100}$$

Motivation levels are assigned values between 0 and 1. The intention category value may be assigned values between 0 and 100. The motivation levels may be detected by the number of micromovements, and the intent category is detected by the Intention Detection component. In contrast, the intent category value may be determined by the asset owner.

After calculating the total risk of a specific intention toward a particular asset with a specific motivation, an access decision may be provided based on the overall risk.

However, basing the access decision on overall risk alone is misleading, as a low percentage risk may result in a wrong access decision unless the asset value is also taken into consideration. Accordingly, the risk assessment component may assess risk as follows:

$$\text{Total Estimated Loss} = R * \text{Asset value} \quad (3)[1]$$

The Total Estimated Loss is the value provided to the decision-making component for determining whether to deny or to permit access to protected assets. The value of the total estimated loss may be in the form of dollars for making better informed decisions from higher management and/or asset owner.

The Access Decision (AD) component may map the Risk Assessment output to a decision about whether to grant or deny access to an asset. AD may base the decision on the estimated loss of value in an asset and the threshold of accepted value loss in an asset. The decision is to be determined by the organization deploying the system to deny or allow access. The organization may determine levels of access, report incidents, raise flags, and/or monitor users [1].

Various theories and models offer a link between intention and behavior including the Interpersonal Deception Theory (IDT), the Expectancy Violation Theory (EVT) and the Signal Detection Theory (SDT) as well as the Fight, Flight, and Freeze Responses.

The Interpersonal Deception Theory explains the process that leads to interpersonal deception and shows the aspects related to the interaction that stimulates it. IDT defines deception as a strategic activity that leads subjects to avoid detection. It influences behavior, movement and counter-movement, to change [30]. Expectancy Violation Theory is concerning the nonverbal and verbal behavior cues that allows for detecting the expected behavior and if any violations exist in that behavior as well as the consequences of the violations [20]. It allows for classifying nonverbal cues to whether it has behavioral anomalies or deviations from a baseline. In order to detect if a behavior is suspicious or normal, the Signal Detection Theory (SDT) that was developed by Green and Swets [21] can be used. It defines two sets of probabilities in a signal detection test where two possible stimuli types are differentiated. Further, according to [22] "Fear can trigger the 'fight or flight' response to raise the heart rate, sharpen the senses and provide access to huge amounts of energy in order to cope with threats to survival. At times, the threat is so intense it can cause a 'freeze' response. This could be interpreted as the brain being overwhelmed, or it may have evolved as a way of keeping still to hide from predators" [30]. The above theories provide the theoretical foundation for intention detecting using micromovement as a behavior measurement.

Intention detection has been studied in many research areas, including neuroprosthetics [23], activity support [24], in the context of human and information security generally [31, 32, 33, 34, 35], and in the context of access control specifically [1, 27]. The area of neuroprosthetics (the field of aiding patients in movement restoration) is a widely studied research area where the intention of movement is detected by analyzing the EEG and Electromyogram (EMG) signals [25, 26]. Activity support approaches targeted intention detection by observation. Nakauchi et al. [27] proposed human behavior detection using embedded sensors in a smart room. Sensors are placed on doors, drawers, chairs . . . etc. The data collected from these sensors is sent to the main server for analysis. Behaviors were recognized from the external observations by recording the current status of objects, observed events and the frequency of activities. The system is capable of detecting the behavior of studying, eating, arranging and resting based on analyzing the sequences of actions. An experiment run on 10 participants showed an accuracy rate of 93.7% with new system users.

A relevant research area that targets hostile intent for access control focuses on identifying deception by the analysis of vocal expressions. GK1 is a layered voice analysis (LVA) software which is produced by Nemesysco and is used for access control system [28]. The software manufacturer claims that by answering 3-5 questions, intentions can be detected. However, Elkins et al. [29] argued that a deception detection solution that relies only on one cue such as voice lacks the ability to detect voice control capable individuals. The authors state that multiple sensors to collect various information, such as heart rate, pupils dilation and linguistic content, should be applied to reduce false positives and to eliminate false negatives.

Burgoon et al. [30] proposed an intention detection for hostile actions by using deception detection in communication, verbal and non-verbal. The authors stated that the presence of deception as an internal state will result in deceptive cues that arise suspicion. They map an intention to an internal state that results in a behavior. However, an internal state might result in many behaviors and one behavior might be the result of many internal states which results in a weakness in the proposed approach. The authors used the interpersonal deception theory (IDT) to map behavioral cues to profiles. They defined a threshold of suspicion or trust behavioral cues as their detection method. The inferred intent is the result of behavioral cues which elicit arousal level, power, pleasantness and intensity, and which are compared to general and individual-specific expected behavioral profiles. The approach requires a large database of different profiles for behavior detection for the decision method to be accurate. Any different behavioral approach of a hostile intent will result in a false negative. New hostile actions will then be logged and stored in the database in order to become a valid detection signature. Because of the use of an observational behavioral based method, such approach varies between individuals and any hostile intent holder can fool the system by either mimicking a good intention or approaching the hostile action differently.

Experimentation on real hostile intent situations is a challenge for researchers as it is nearly impossible to mimic real-world scenarios of hostile intent that might cause harm to participants. The experiment design will not be as real as it should be to evaluate the proposed solution. Elkins et al. [29] stated that applying social psychology theory and communication to evoke real emotions, stress and tension reduces this limitation of experimental design and makes the evaluation of proposed solutions acceptable.

Intention detection plays a role as well in identifying social and terrorist networks [31, 32, 33, 34, 35]. Vybornova et al. proposed a method for identifying social tension and intention detection on the basis of natural language semantic analysis [35]. The authors used language syntax and semantics with statistical processing to identify social tension. They also used the general laws of natural language general psychological, psycholinguistic and sociological rules and trends as a basis of their method.

A related work is done by [36] which investigates the possibility of detecting agreement vs. disagreement intention using the EEG signals with presented sentences before participants stated their intentions. This shows promise in the ability in detecting intentions of access by analyzing the EEG signals. The authors reported 80.62% accuracy using the Support Vector Machine classifier on the FC2, Frontal-Central location 2, EEG channel.

Further, the P300-based Concealed Information Test (CIT), formally known as the Gulity Knowledge Test (GKT), for crime-related details has reported an accuracy rate of correct detection that ranges between 70%-100% accuracy [37]. From the P300-based CIT perspective of pre-crime, Meixner et al. [38] were able to detect the existence of terrorists' future plans by applying CIT with a proof of the robustness of using P300, to detect the existence of future terrorist plans. The authors have run an experiment on 24 participants divided in two equal groups: one group planning a terrorist attack and another group planning a vacation. The terrorist group was tested on three pieces of concealed information: knowledge of location, method, and time. By stimulating the participants' brains with text of two categories, 1) Target that represents the location, method, and time of the terrorist attack, and 2) Non-target that represents general locations, times, and methods, the authors achieved 100% correct classification of terrorists and innocents. The result of the experiment showed that the terrorist group resulted in a P300 peak to those target texts enabling detection of 12/12 of the terrorist group with no false positives out of 24 suspects, 12 of which were innocents. The authors suggest that this protocol has the potential to detect future terrorist activity; however, the approach is not suitable for access control as it requires over 25 minutes of stimuli presenting time. Furthermore, the authors' protocol required subjects to practice for 5 minutes which is not realistic in real-world scenarios and questions their results. The authors requested subjects to respond to a visual stimulus which presents a weakness in the approach as the approach requires the cooperation from the subject to detect their intentions.

IBAC [1] system includes an approach for intention detection that targets the source of intention, which is the brain. The Intent Detection component of the IBAC model is based on the involuntary response towards stimuli which are generated by the brain and are extremely hard to control. The method utilizes the Concealed Information Test (CIT) formally known as Guilty Knowledge Test (GKT) to detect intentions of access. However, due to the nature of the EEG signal acquisition, the user acceptance level only reached 10%. Some embodiments described herein may substitute the physiological measurement with a microbehavioral measurement in order to address the acceptability of the technology. Some embodiments described herein may be based on one or more principles that: (i) "intentions of access can be detected by analyzing head micromovement patterns when presenting visual stimuli"; and (ii) "the intent corresponding motivation can be detected by analyzing the number of micromovements." Table 1 (below) summarizes related work in the intention detection area showing the utilize classifiers and the accuracy of each method as well as comments on each proposed method.

TABLE 1

Summary of intention detection related work:

| Intention Detection Method | Algorithm | Accuracy | Comments | Ref. |
| --- | --- | --- | --- | --- |
| Physiological: EEG-based | Support Vector Machine (SVM) and Random Forests | 100% | Intent-based Access Control (IBAC) Requires less than 1 minute to detect the intention of access | 1 |
| Physiological: EEG-based | Bootstrap | 100% | Requires over 25 minutes to detect the intention of access | 37 |
| Physiological: EEG-based | SVM | 80.62% | Limited to the detection of the intention to agree or disagree | 35 |

TABLE 1-continued

Summary of intention detection related work:

| Intention Detection Method | Algorithm | Accuracy | Comments | Ref. |
|---|---|---|---|---|
| Behavioral/ Physiological-based | Confidential | 100% | Layered Voice Analysis (LVA), Requires answering questions. | 26 |
| Behavioral/ Physiological-based | Confidential | 70% | Future Attribute Screening Technology (FAST), Uses: Electrocardiogram, Eye Movement and Facial Expressions, Requires an interview. | 7 |
| Observational-based | C.50 Learning System | 93.7% | Requires Movement Sensors to detect movement intentions | 27 |

As described herein, an intention may be defined as a conscious decision to potentially perform an action. Intentions are deliberate, and forming one is an automatic process unless it is revised. An intention leads an agent to perform the action directly. Intentions have stability; once formed, an intention has a tendency to persist [39]. Further, when individuals are presented visual stimuli that represent their concealed intention, the stimuli may trigger surprise and fear. The surprise and fear result in paying more attention to the visual stimuli and result in the Fight, Flight, and Freeze Responses. Furthermore, in [40] Seltzer discusses the freeze response and discusses the paralyzing human experiences due to the delay in response due to the decision making of fight or flight. Therefore, the present application proposes that when a user is presented a set of possible intentions, the pattern of head micromovement would be distinguishable when comparing stimuli that represent the current user's intention from stimuli that do not represent the current user's intention. Precisely, the number of micromovements when presenting the user's current intention would suddenly decrease in number due to the freeze response when compared with the number of micromovement when presenting non-related intentions.

In some scenarios, a knowledge of an intention does not necessarily mean that an action associated with the intention will be executed. Accordingly, in some scenarios, the lower the number of micromovement when compared with current normal head micromovement, the higher the motivation towards that intention is. That is, a user may have involuntary and continual micromovements; however, when the user may be presented with a stimuli associated with a concealed intention, the number or frequency of micromovements exhibited by a head of the user, for example, may change.

Reference is made to FIG. 1, which illustrates a simplified block diagram of a system 100 for intent-based access control, in accordance with an embodiment of the present application. The system 100 may include hardware having electronic circuit components, software including processor-executable instructions, and a combination of examples thereof with practical application for providing intent-based access control or providing behavioral based intention detection.

The system 100 includes a processor 112, a memory 114, and a movement detection sensor interface 130. The system 100 may be configured to receive movement data, via the movement detection sensor interface 130, from one or more movement detection sensors (not illustrated). The movement detection sensor interface 130 may be in communication with the one or more movement detection sensors.

The processor 112 may execute processor-executable instructions stored in the memory 114. The processor-executable instructions may, when executed, conduct operations described herein. In some embodiments, the instructions may be provided by an intention detection application 116a, a motivation application 116b, a risk assessor application 116c, or any combination of the aforementioned or other application. Although instructions may be provided by one or more separate applications, in some other embodiments, the instructions may be provided by an application, such as the access control application 116, stored in the memory 114.

In some examples, the memory 114 may store risk data 118. The risk data 118 may include data for determining a risk score associated with an access request associated with a protected resource. The determined risk score may be based at least on a determined potential intention of a user or a motivation score associated with the determined potential intention of the user and may provide a measure of impact of ill-intended malicious access to the protected resource.

Although potential intentions may be associated with ill-intended malicious access to protected resources, in some examples, potential intentions may be intentions that are not ill-intentions and that may be used for analyzing user behavior. For instance, the system 100 may be used by retail companies for analyzing potential intentions of shoppers in a shopping mall. When presenting target stimulus (e.g., visual images on visual displays, acoustic sound via loudspeakers, etc.) associated with purchasing products, the system 100 may be configured to determine, based on analyzing micromovements of the target user, whether a user being exposed to the target stimulus may have a potential intention to purchase products associated with the target stimulus.

In an illustrating example, the system 100 may be configured for use by a food court of a shopping mall and the target stimulus may be an olfactory stimulus, such as the smell of butter popcorn. The system 100 may be configured to determine, based on analyzing micromovements of the target user before and upon being presented with the olfactory stimulus (e.g., smell of butter popcorn), whether the target user may have a potential intention to purchase popcorn related products. In the present example, the system 100 may determine that the user has the potential intention to purchase popcorn related products. In response to identifying the potential intention, the system 100 may be configured to transmit a signal indicating the potential intention to a resource controller for providing a sample of the popcorn product to the target user. In the present example, providing samples to the target user with the potential intention of purchasing can increase chances that the product may be sold to that target user.

The processor 112 may be any type of micro-processor or microcontroller, a digital signal processing (DSP) processor, an integrated circuit, a field programmable gate array (FPGA), a reconfigurable processor, or combinations thereof.

The movement detection sensor interface 130 may be in communication with one or more movement detection sensors. The movement detection sensor interface 130 may be configured to receive micromovement data representing head micromovement of a user under test. As will be described herein, received micromovement data may be initial micromovement data representing head micromovement of a user associated with the user access request when the user is presented with a non-target stimuli. In some other examples, received micromovement data may be initial micromovement data representing head micromovement of a user when the user is not presented with a target stimuli.

Further, the received micromovement data may also include stimulus-based micromovement data representing head micromovement upon the user being presented with a target stimulus associated with a potential intention.

In some embodiments, the movement detection sensor interface 130 may receive micromovement data via a wireless communication channel. For example, the wireless communication channel may be a short range communication interface, such as Bluetooth™ or other short-range communication interface. In some other embodiments, the movement detection sensor interface 130 may receive micromovement data via a wired communication channel.

As an illustrating example, the user access request may include a request to enter a science laboratory. The target stimulus may include visual images of the laboratory being set on fire. Accordingly, the stimulus-based micromovement data may represent head micromovement upon the user associated with the user access request being presented with the visual images of the laboratory being set on fire. As will be described, the system for intent-based access control may identify whether the number of micromovements (or micromovement patterns) decreases as the user focuses his or her attention on the target stimulus.

In some embodiments, the one or more movement detection sensors may be a gyroscope sensor, such as a micro-electro-mechanical systems (MEMS) integrated circuit with a full-scale range of 500°/s chip on each respective axis. The example MEMS integrated circuit may be a two-axis rotational accelerometer that measures acceleration on each axis over the duration of each sample, which may be 128 times per second. Other types of gyroscope sensors may be contemplated. In some examples, the gyroscope sensor may be positioned within a hat of the user for detecting head micromovements of the user. In some examples, the gyroscope may be positioned within some jewelry worn by the user. In some examples, the gyroscope sensor may be positioned within a mobile electronic computing device, and the gyroscope sensor may sense micromovements based on a portion of the user that is holding the mobile electronic computing device. In some other examples, the gyroscope sensor may be positioned within other objects associated with the user or may be positioned on other portions of the user's body.

In some embodiments, the one or more movement detection sensors may include an image capture device to capture images for tracking micromovement of a subject under test. In some examples, the image capture device may be configured to capture video images at a high frame rate for tracking micromovement of a subject under test. For example, the image capture device may capture successive images of the subject under test at a frame rate of 128 frames per second. It may be appreciated that an image capture device having any other frame rate, including greater than 128 frames per second, may be used for capturing images for tracking micromovement of the subject under test. For instance, an image capture device capturing images at 128 frames per second may provide data representing micromovement of the subject under test at a similar granularity to the above-described example MEMS sensor (e.g., sampling 128 times per second). It may be appreciated that movement detection sensors having a greater number of data samples per second may be used, thereby increasing the number of available data points and increasing the accuracy in detecting micromovement and patterns over time.

In some embodiments where the movement detection sensor may be an image capture device, the system 100 may conduct image processing operations based on successive captured images. In some examples, the image processing operations may conduct pixel-by-pixel operations to detect whether micromovement patterns exist. To illustrate, the image processor operations may conduct pixel-by-pixel operations for identifying whether changes to pixel values from one frame to subsequent frames indicate presence of micromovement patterns, such as micromovement in an up-down-down-up pattern. The above described image processing based on pixel data is an example and other image processing operations to detect micromovement patterns may be contemplated.

In some embodiments, the one or more movement detection sensors may include wave-detection sensors, such as ultrasonic sensors, for detecting micromovement of the subject under test. In some embodiments, the one or more micromovement sensors may be force sensors positioned about an environment of the subject under test. For example, the force sensors may be configured beneath a room floor or beneath a testing area and the force sensors may, as a proxy, detect micromovements based on changes in detected force upon the force sensors on a room floor. That is, micromovements of a head of the subject under test may result in variation of forces relative to force sensors placed underneath a testing area floor. In some examples, the system may conduct operations for calibrating the force sensor positioned about the environment such that forces attributed to environmental factors (e.g., airflow from heating, ventilation, and air conditioning systems, or other systems) may be taken into account when detecting forces associated with micromovements of the subject under test.

As will be described herein, the system 100 for intent-based access control may be used for detecting and analyzing involuntary head micromovements, such as movements on the micro or milli-scale, and for determining or deducing user intention and motivations based on changes to micromovement patterns of a user exposed to target stimuli. Target stimuli may be visual stimuli, acoustic stimuli, olfactory stimuli, tactile stimuli, or taste-based stimuli.

In some examples, the system 100 includes a stimulus output device 132 coupled to the processor 112, where the stimulus output device 132 may provide the target stimulus for presentation to the user associated with the access request. In some examples, the target stimulus may be a visual display, an acoustic transducer (e.g., for acoustic stimulus), an olfactory output device (e.g., for smell stimulus), a chemical substance output device (e.g., for taste stimulus), or a tactile output device (e.g., for touch stimulus).

In some embodiments, the target stimulus may be provided by other means external to the system 100. To illustrate, the target stimulus may be a security guard that may walk within view of a target user and the target stimulus may be associated with a potential intention, such as shoplifting. The system 100 may include an image capture device (e.g., micromovement detection sensor) coupled to the movement detector sensor interface 130. When the security guard walks within view of the target user, the system 100 may receive, from the image capture device, stimulus-based micromovement data representing head micromovement upon the user being presented with the target stimulus (e.g., view of the security guard). As will be described herein, the system 100 for intent-based access control may determine, based on stimulus-based micromovement data, whether the user that is presented with a view of the security guard has an intention to shoplift. Because intentions may be future plans and because an individual possess knowledge about their intention, the system 100 for intent-based access control may exploit self-knowledge existence about a potential intention before the potential intention is executed by analyzing involuntary head micromovements of the user. Although examples of the system 100 are described for analyzing head micromovements of a user under test, it may be appreciated that the system 100 may also analyze micromovements of other physical portions of the user.

In some embodiments, the system 100 may include a communication interface 134.

The communication interface 134 may be configured to communicate with other components or computing devices to exchange data with other components, to access and connect to network resources, or perform other computing applications by connecting to a network (or multiple networks) capable of carrying data including the Internet, Ethernet, plain old telephone service (POTS) linie, public switch telephone network (PSTN), integrated services digital network (ISDN), digital subscriber line (DSL), coaxial cable, fiber optics, satellite, mobile, wireless (e.g., Wi-Fi WiMAX), SS7 signaling network, fixed line, local area network, wide area network, and others, including any combination of the aforementioned examples.

In some embodiments, the communication interface 134 may be configured to transmit signals representing access decisions to a protected resource controller. The protected resource be a physical building or an electronic device, and the protected resource may include the protected resource controller for receiving the signal representing an access decision for actuating a mechanical actuator (e.g., to unlock a door for a physical building), for granting access to electronic documents (e.g., software signal to allow access to an electronic computing device), or for allowing access to other example protected resources.

In some examples, access control may be provided at different levels of access (e.g., tiers of security access), and different levels may be assigned based on at least one of accessed intentions, motivations, risk scores, or any combination of the foregoing. Example signals representing an access decision may provide access having different characteristics, such as temporary access, monitored access, limited access, restricted permissions (only read, only write, no deletions), etc.

Potential intentions may be derived from intrinsic and/or extrinsic agents. An intention may be an action that is a future plan. Because an intention may be a future plan and because an individual user possess knowledge of their intention, the system 100 may be configured to deduce the self-knowledge existence of the intention by analyzing involuntary micromovements of the individual user. In some embodiments, the system 100 may analyze head micromovements of the individual user. In some other embodiments, the system 100 may analyze micromovements of other parts of the individual user's body. The analysis may be based on a theoretical foundation that when individual users are presented stimulus that may be associated with concealed intentions, the stimulus may trigger surprise and/or fear in the individual. The surprise or fear may cause the individual user to pay more attention to the presented stimulus and may result in a "flight, flight, or freeze" response. Accordingly, when an individual user is presented with one or more stimuli associated with potential intentions, head micromovement patterns and/or frequency may be distinguishable from other head micromovement patterns and/or frequency associated with stimuli that do not represent the individual user intentions. In particular, the system 100 may analyze head micromovements to determine whether there may be a decrease in head micromovements or micromovement patterns due, at least, to a "flight, flight, or freeze" response induced by the presented stimulus associated with the potential intention.

Figure 2:
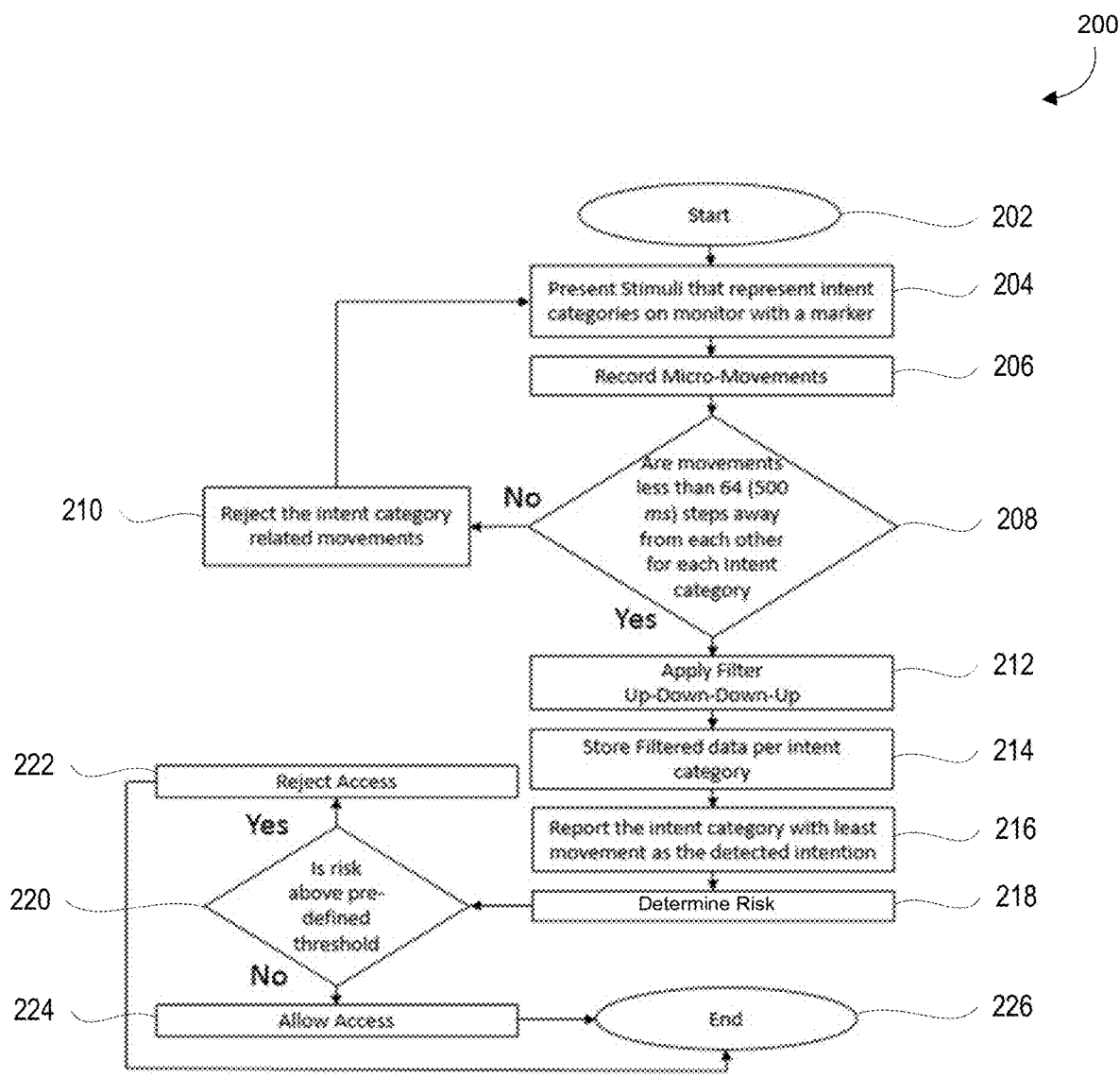
FIG. 2 illustrates a flowchart of a method of intent-based access control, in accordance with an embodiment of the present application.

Reference is made to FIG. 2, which illustrates a flowchart of a method 200 of intent-based access control, in accordance with an embodiment of the present application. The method 200 may be conducted by the processor 112 (FIG. 1) of the system 100. The method 200 may include instructions of the access control application 116 (FIG. 1) or any other processor readable instructions stored in the memory 114 of the system 100 of FIG. 1.

At operation 202, the processor 112 may conduct a start command in response to receiving a user access request to a protected resource. The processor 112, for example, may receive a username at an input device (e.g., keypad, touchscreen, etc.) and the username may be deemed a user access request by the user individual associated with the username.

As an illustrating example, the protected resource may be a science laboratory and the science laboratory may have an access doorway for allowing or restricting access to the laboratory based on one or more example access control operations described herein. In some examples, the system 100 may conduct access control via the doorway based on identity-based, risk-based, or a combination of identity-based and risk-based access control. For example, the system 100 may allow an individual to enter through the doorway if they are identified as a permitted occupant of the laboratory and if they are assessed as having a low-risk of conducting ill-intended actions within the laboratory. To determine whether the identified individual is likely to conduct ill-intended actions (e.g., setting the laboratory on fire) within the laboratory, the system 100 may conduct operations for identifying potential intentions (e.g., intention to set the laboratory on fire, or other potential intentions).

In some embodiments, the system 100 may present a series of stimulus to a user for determining the intention and/or motivation of the user for individual potential intentions associated with the respective stimuli. That is, the system 100 may be configured to identify individuals that may be likely to conduct any one of a series of potential intentions.

At operation 204, the processor 112 may, using the stimuli output device 132 (FIG. 1), present stimuli that represent intent categories on a visual display monitor. To illustrate, the stimuli output device 132 may be a visual display positioned adjacent the laboratory doorway and may be configured to present images of a science laboratory set on fire. Other forms of stimuli may be contemplated, such as acoustic stimuli (e.g., sounds on a loudspeaker), olfactory stimuli (e.g., smells mimicking particular events, such as burning wood), tactile stimuli, or chemical stimuli.

In response to the user being presented with stimuli (e.g., images of a science laboratory set on fire) associated with a potential intention of setting objects within the laboratory on fire, the processor 112, at operation 206, may receive, via the movement detection sensor interface 130 (FIG. 1), micromovement data representing micromovement data representing head micromovement of the user associated with the user access request. For example, the movement detection sensor may be an image capture device positioned adjacent to the laboratory doorway for capturing images of the individual user, and the movement detection sensor interface 130 may be in communication the image capture device.

At operation 208, the processor 112 may determine whether respective micromovement data points are less than 64 steps (e.g., 500 ms) away from an adjacent micromovement data point for an intent category. In some examples, an intent category may represent a particular potential intention (e.g., setting the laboratory on fire).

In a scenario when a movement detection sensor operating to capture 128 samples per second is used and when a given data point is greater than 64 steps away from a successive data point, the processor 112 may determine that the detected movement may be a voluntary movement (e.g., not an involuntary movement characteristic of a micromovement). When the processor 112 determines that the data point(s) may be voluntary movements, the processor 112 may determine that the user may have moved their head away from the target stimuli and may no longer be focusing on the target stimuli.

Thus, the processor 112 may disregard data points indicative of voluntary movement, as these data points may not be associated with user micromovements associated with target stimuli. The processor 112 may conduct operation 208 to determine whether captured movement data may be involuntary, micromovement data. If the processor 112 determines that the captured movement data may be voluntary movement data, the processor 112 may discard the set of movement data indicating voluntary movement.

It may be appreciated that the above described operation of determining whether movements are less than 64 steps away from another movement is one example directed to ensuring that the user is not attempting to mimic involuntary micromovements in an attempt to circumvent the system (e.g., attempt to mimic movements such that the system may falsely indicate a user intention, when there may not be any such user intention).

Further, the above described operation of determining whether movements are less than 64 steps away from another movement is one example directed to ensuring that the user may be looking at a stimulus output device (e.g., when a target stimulus includes one or more visual images). For instance, when the processor 112 determines that the movements may not be less than 64 steps away from an adjacent movement, the processor 112 may determine that the user may be looking away from the stimulus output device. In the scenario where the user may not be looking at the stimulus output device, any movements or micromovements may not be associated with the target stimulus presented by the stimulus output device.

In response to determining that the respective micromovement data points are not less than 64 steps away from an adjacent micromovement data point, the processor 112, at operation 210, may reject the micromovement data associated with an intent category. The processor 112 may determine that the micromovement data is not suitable for determining whether the individual user may have the potential intent (e.g., setting the laboratory on fire) associated with the provided stimuli. That is, the processor 112 may determine that the captured micromovement data may be associated with voluntary user movement (e.g., moving the user head away from the target or provided stimuli).

In response to determining that the respective micromovement data points are less than 64 steps away from an adjacent micromovement data point, the processor 112, at operation 212, may apply a pattern filter to the received micromovement data. In some embodiments, a head micromovement pattern may be a sequence of head micromovements. The sequence of head micromovements may be involuntary and may include a discrete sequence of head micromovements, such as Up-Down-Down-Up.

In some embodiments, head micromovements may include approximately 1000 small involuntary movements a second. Although head movements may be a result of physiological characteristics, such as heart beats, yawning, speaking, eating, emotional reactions, head micromovements by contrast may be small (e.g., milli or micro range movements), involuntary, and/or repetitive movements that may be at a relatively high frequency (e.g., 1000 movements per second). It may be appreciated that the prefixes "milli" and "micro" are relative terms to contrast head micromovements (e.g., involuntary small head movements having a high frequency) with head movements (e.g., voluntary user head movements). The operations described herein may analyze the behavioral characteristics of head micromovements when the individual user is exposed to a target stimuli as compared to when the individual is exposed to a non-target stimuli for determining a potential intention associated with the individual user.

While user micromovements may occur, for example, at a frequency of 1000 movements per second and while some described examples herein utilize a movement detection sensor with a sampling rate of 128 samples per second, it may be appreciated that when a movement detection sensor with a sampling rate of greater than 128 samples per second is used, the system 100 may determine a number or frequency of micromovement patterns with greater accuracy/granularity.

At operation 214, the processor 112 may store in the memory 114 filtered data per intent category. In the present example, a single intent is described (e.g., setting a laboratory on fire); however, the stimulus output device 132 may be configured to provide a series of stimuli associated with a respective intent category. The processor 112 may associate respective sets of received head micromovement data to respective intent categories corresponding to stimuli provided at the stimulus output device 132.

Based on a theoretical foundation that individual users presented with stimulus associated with concealed intentions may be surprised causing the individual to pay more attention to the presented stimuli, the operations described herein may determine that the user has a potential intention associated with a presented stimuli when a number or frequency of micromovements or patterns decreases.

At operation 216, the processor 112 may report one or more intent categories with the least number of or the lowest frequency of micromovements or micromovement patterns. Accordingly, the identified one or more intent categories may be associated with a potential intent of the individual user.

At operation 218, the processor 112 may determine a risk score. In some examples, the risk score may be determined based, at least, on motivation of the individual user to undertake an action associated with the potential intention. Accordingly, motivation of an individual may be associated with a probability of a potential intention being undertaken by the individual user.

At operation 220, the processor 112 may determine whether the risk score is above a pre-defined threshold value. In some examples, the pre-defined threshold value may be configured by an administrator of the system 100. The pre-defined threshold value may be associated with a threshold of accepted loss of a protected asset, in the event that an individual user action corresponding to a potential intent is undertaken.

In response to determining that the risk score is above the pre-defined threshold value, the processor 112 may, at operation 222, generate a signal representing a reject decision indicating that the user access request is rejected. In the present illustrating example, the signal representing the rejected decision may be transmitted to an actuator of the laboratory doorway for placing the actuator in a "lock" position to prevent the doorway from being opened.

In response to determining that the risk score is not above the pre-defined threshold value, the processor 112 may, at operation 224, generate a signal representing an allow decision indicating that the user access request is accepted. In the present illustrating example, the signal representing the accepted decision may be transmitted to the actuator of the laboratory doorway for placing the actuator in an "unlock" position to allow passage of the individual user through the doorway.

At operation 226, the processor 112 may end operations of the method.

As an illustrating example, the system 100 may be configured to provide intent-based access control to an unmanned-aerial vehicle (e.g., drone device) for capturing photos of a pipeline facility. In the present example, two intent categories may be defined. Intent category 1 may be associated with an operator navigating the unmanned-aerial vehicle for capturing photos of the pipeline facility and navigating the unmanned-aerial vehicle back to the originating position, thereby causing $0 in monetary damages. Intent category 2 may be associated with an operator navigating the unmanned-aerial vehicle into portions of the pipeline facility (e.g., crashing the unmanned-aerial vehicle into a pipeline), thereby causing physical pipeline damage requiring repairs costing $1 million. An intent category value of 98 out of 100 may be assigned to intent category 2. It may appreciated that the intent category value may be pre-assigned or pre-configured for the system 100, and that the intent category value may be any other value or on a scale other than 0 to 100.

In the present example, the system 100 may be configured to determine whether to provide access to the unmanned-aerial vehicle, based on example operations described herein. Prior to providing access to the unmanned-aerial vehicle, the system 100 may present one or more target stimuli to the operator and analyze head micromovements of the operator upon the operator being presented with the one or more target stimuli. In the present example, the system 100 may determine baseline micromovement data. For example, when a blank display screen (e.g., stimuli output device) is shown to the operator, the system 100 may determine that the head of the operator exhibits 10 instances of a micromovement pattern (e.g., up-down-down-up micromovement pattern) for a given time period. In response to presenting a target stimuli for intent category 1, the system 100 may determine that the head of the operator exhibits 11 instances of the micromovement pattern for a given time period. Further, in response to presenting a target stimuli for intent category 2, the system 100 may determine that the head of the operator exhibits 3 instances of the micromovement pattern for a given time period. Accordingly, the system 100 may, at operation 216, identify intent category 2 with the lowest instances of the micromovement pattern for a given time period.

Continuing with the present example, the system 100 may determine that the difference between the baseline micromovement data point and the micromovement data point for intent category 2 is 7 instances of the micromovement pattern for the given time period and may determine that there is a 70% chance (or motivation measure) that the operator may conduct actions associated with intent category 2. Accordingly, the system 100 may determine that a risk value is 0.7*98/100=68.6% risk (e.g., (motivation measure×intention category value)/100=risk value). In an example where the system 100 may be preconfigured to utilize a risk threshold value of 25%, the system 100 may determine that access to the unmanned-aerial vehicle is denied, at least, because the calculated risk value is greater than the risk threshold value. It may be appreciated that the definitions of intent category value, risk value calculation, definitions of risk threshold value, etc. are illustrative examples and other methods for calculating risk or defining risk categories may be contemplated. For example, an administrator of the system 100 may preconfigure the risk threshold to a value of greater than 25% if the administrator may have a higher tolerance for risk.

In some embodiments, a movement detection sensor may be a gyroscope sensor included in a MEMS circuit. The MEMS circuit may be a two-axis rotational accelerometer configured to measure acceleration on each access over the duration of each same. In some examples, the sampling rate may be 128 samples per second. In some examples, the gyroscope sensor may be embedded in an Emotiv EPOC™ device and may be worn by an individual user.

Although the gyroscope sensor is an example that may be mounted on a user's head for measuring head micromovements, other methods of detecting head micromovements may be contemplated. For example, detecting head micromovements and collecting head micromovement data may be conducted using laser movement measurement device having sensing capability to detect micromovements or image capture devices having frame rate specifications suitable for detecting micromovements of an individual user within a field of view of the image capture device.

Figures 3A, 3B:
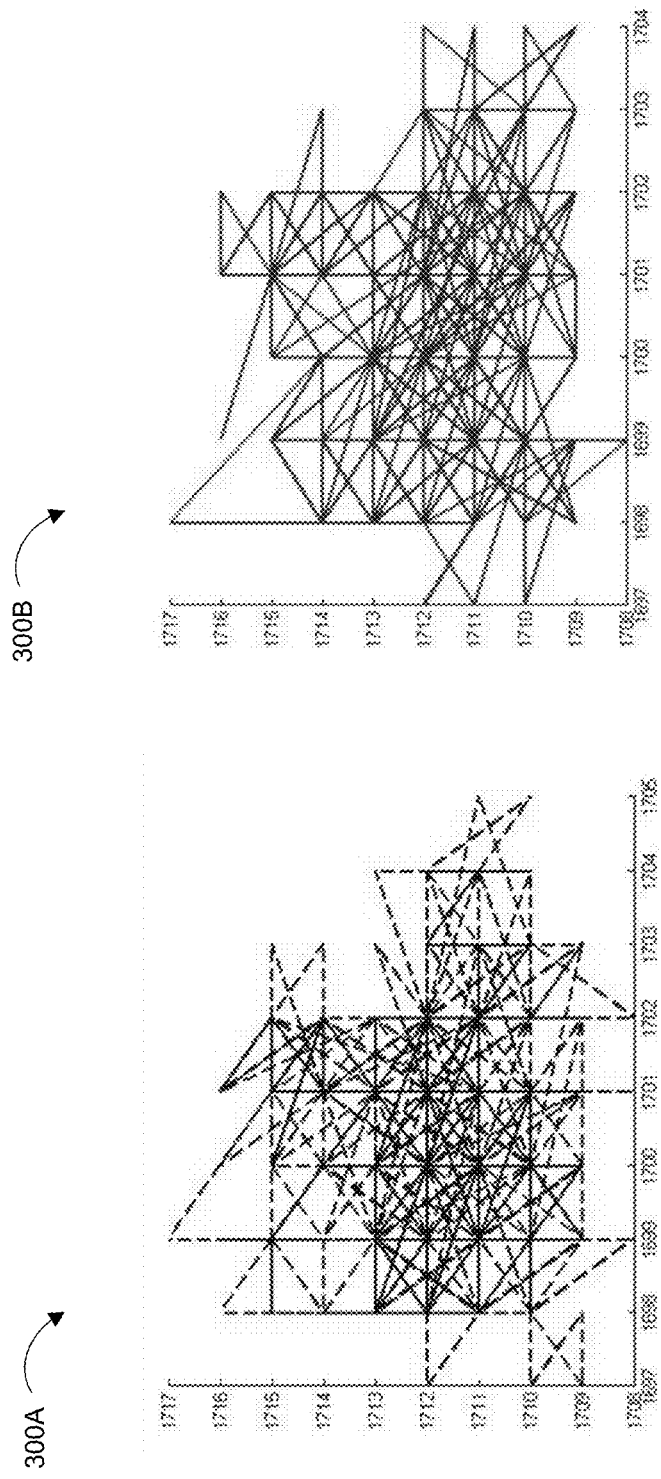
FIGS. 3A and 3B illustrate head micromovement data plots, in accordance with embodiments of the present application.

Reference is made to FIGS. 3A and 3B, which illustrate head micromovement data plots, where the micromovement data was collected using a gyroscope sensor, in accordance with embodiments of the present application. In some embodiments, the gyroscope sensor may be a small MEMS chip with a full-scale range of 500°/s on each axis. The MEMS chip may be a two-axis rotational accelerometer that measures the acceleration on each axis over the duration of each sample, which may be 128 times per second. In some examples, the head micromovement data may be captured using a laser movement measurement device or an image capture device having specifications for detecting micromovements.

In FIGS. 3A and 3B, the head micromovement data represents head micromovement of the individual user when an individual user may be presented with a target stimulus and a non-target stimulus, respectively. For instance, a target stimulus may be associated with a potential intention of a user (e.g., images of a laboratory set on fire being associated with a potential intention of undertaking action to set a building facility on fire). In some examples, a non-target stimulus may be associated with images that are not associated with any particular potential intention. For instance, a non-target stimulus may be associated with images unrelated to any particular potential intention.

The head micromovement data illustrated in FIGS. 3A and 3B may be plotted prior to application of a pattern filter. The head micromovement data 300A illustrated in FIG. 3A and the head micromovement data 300B illustrated in FIG.

3B depict movement in the x-axis and the y-axis of the gyroscope sensor. The x-axis may be an x-axis space representation of the user head and the y-axis may be a y-axis space representation of the user head. The head micromovement data illustrated in FIGS. 3A and 3B may illustrate data when an individual user is focusing on a stimulus output device 132 (FIG. 1), and not voluntarily moving the individual user's head. In FIGS. 3A and 3B, the micromovement data spans approximately nine steps of movement in the y-axis direction. The micromovement data may capture micromovements approximately every 1.28 ms. It may be appreciated that significant head movement, such as in an "up" direction for one second, may be associated with 128 micromovement data samples. Accordingly, the system 100 may utilize a threshold number of recorded micromovements per second for determining whether movement data generated by the gyroscope is associated with voluntary or significant movement or is associated with involuntary micromovement. Thus, the system 100 may conduct operations of a noise detection algorithm for determining if a movement is voluntary or involuntary (e.g., micromovement of the user).

In some examples, the system 100 may conduct operations for pre-processing captured micromovement data for identifying micromovement data that is associated with involuntary user micromovements, rather than voluntary user movements. In another example, the system 100 may be preconfigured to disregard a predefined number of micromovement data points for a respective subset of micromovement data set at least because an initial number of micromovement data points may not be representative of a user reaction upon focusing on a provided target stimuli (e.g., data associated with a setup time).

In some embodiments, the system 100 may conduct operations for calibrating the movement detection sensors such that movements associated with known environmental factors may be disregarded (e.g., as a micromovement data pre-processing operation) prior to determining whether a user presented with a target stimulus has an associated potential intention.

FIG. 3A illustrates head micromovement data 300A collected when a non-target stimulus is presented to an individual user. FIG. 3B illustrates head micromovement data 300B collected with a target stimulus is presented to the individual user.

Figure 4:
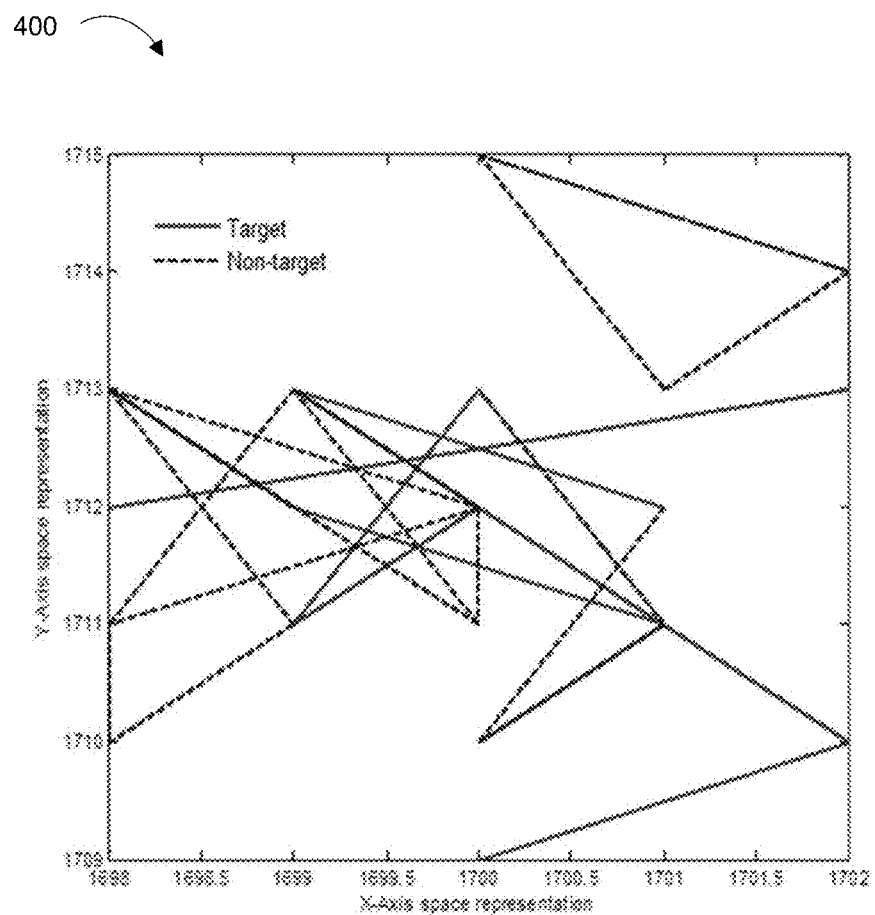
FIG. 4 illustrates a head micromovement data plot after applying a pattern filter to the head micromovement data of FIGS. 3A and 3B.

Reference is made to FIG. 4, which illustrates head micromovement data 400 after applying a pattern filter to the head micromovement data of FIGS. 3A and 3B. FIG. 4 depicts the x-axis and y-axis head micromovement data after retaining head micromovement data having a sequence of Up-Down-Down-Up movements, as defined by an example pattern filter.

In some embodiments, the system 100 may receive a first set of micromovement data associated with presentation of a first target intention to the user and may receive a second set of micromovement data associated with presentation of a second target intention to the user. The first set of micromovement data may be the head micromovement data 300A illustrated in FIG. 3A. The second set of micromovement data may be the head micromovement data 300B illustrated in FIG. 3B. The system 100 may conduct operations to identify portions of micromovement data that exhibit a particular micromovement pattern (e.g., micromovement sequence of up-down-down-up in the y-axis space representation).

For example, a micromovement data sequence having data sample values 4, 5, 3, 2, and 3 may be identified as having a particular micromovement pattern. The user head may have moved up (e.g., from data value 4 to 5), down (e.g., from data value 5 to 3), down (e.g., from data value 3 to 2), and up (e.g., from data value 2 to 3). Thus, the above-described data sample values 4, 5, 3, 2, and 3 may be provided on a micromovement data plot, such as that illustrated in FIG. 4. In each respective instance that the system 100 identifies a micromovement data set portion having a sequence associated with a micromovement pattern, the system 100 may identify that micromovement data set portion as a detected instance of the micromovement pattern. Based on the above-described example, the system 100 may identify frequency (e.g., count) of the micromovement pattern occurrences for analyzing or deducing an associated intention of the user under test.

In contrast to systems of intent-based access control based on physiological measurements (e.g., electrical signal measurement of a user's brain, etc.), operations of the system of intent-based access control based on behavioral measurements are less computationally intensive. For instance, operations for detecting changes in micromovement data may be less computationally intensive as compared to operations for processing electrical signals. Further, behavioral measurements, including detection of micromovements of a target user's head based on images, gyroscope movement sensors, etc., may be less intrusive to the target user and may not detract from identifying a natural reaction of the target user upon being presented with a target stimuli.

As described in some examples herein, portions of a person (e.g., head, arms, hands, etc.) may involuntarily or continually move at a micro-level (e.g., micromovements). In response stimuli (e.g., visual, acoustic, olfactory, etc.) associated with a potential intention, characteristics of such micromovements or micromovement patterns may change.

In some embodiments described herein, systems and methods for intent-based access control may, in response to providing a stimuli associated with a potential intention, determine a potential intention of an individual user and may determine a motivation associated with the potential intention of the individual user. The provided stimuli may be associated with a concealed intention and the motivation may be associated with a likelihood that an individual user may conduct or execute an action associated with a potential or concealed intention.

An intention may be associated with an explicit conscious decision to perform an action. Intentions may be deliberate. Once an intention is formed by an individual, the intention may persist. When the individual is subjected to a stimuli that may represent their concealed intention, the stimuli may trigger surprise or fear. The surprise or fear may result in added attention to the stimuli (e.g., "fight, flight, or freeze" responses). Accordingly, when an individual is presented with one or more stimuli associated with respective potential intentions, head micromovement patterns, or micromovement frequency may change as compared to when one or more stimuli not associated with any potential intention of the individual is presented to the individual. For example, a number or frequency of micromovements exhibited by an individual may decrease when the individual is presented with stimuli associated with a potential intention of the individual. The decrease in the number or frequency of micromovements may be due, at least, to a "freeze response" associated with the individual reacting to the stimuli associated with an explicit conscious intention.

Knowledge of a potential intention may not be indicative of the likelihood that the individual will conduct the action associated with the potential intention. For example, an extrinsic intention may be an intention imposed on an individual (e.g., intention that may be hesitation-based). The extrinsic intention may be associated with an intention where the individual may have low motivation to conduct an action associated with the extrinsic intention. An intrinsic intention may be an intention that an individual chooses to have (e.g., intention that may be motivation-based). The intrinsic intention may be associated with an intention where the individual may have high motivation to conduct an action associated with the intrinsic intention.

An illustrating experiment was conducted with a group of 40 participants. The participants included male and female participants between 18-40 years. To simulate the normal usage of real life scenarios, all participants were capable of participating in the experiment regardless of the use of any medication prior to the signal acquisition. All electronic device were put away to ensure that the signals are not affected by external sources and all subjects participated voluntarily with no offers.

The participants were divided into two groups. Group 1 (G1) included 20 participants, where these participants were provided with an extrinsic intention. The extrinsic intention was an intention imposed on them (e.g., hesitation-based intention). Further, Group 2 (G2) included 20 participants, where these participants had intrinsic intentions, such as an intention they chose to have (e.g., motivation-based intension). Data from 10 participants were not usable due to external factors such as sneezing/coughing and system/device malfunctions.

The experiment was setup to deny a person access to a resource if the system determined that the participant may have a malicious intentions about the use of that resource. Group 1 participants were provided with to a physical resource (lab). Access was granted to the physical lab if the system did not identify any potential intentions associated with ill-intent (e.g., malicious intention of burning the lab).

Participants in the experiment were asked to have on their mind the malicious intention of burning a lab while looking at random images that they have never seen before. The participants were shown various pictures, including pictures where the lab is set on fire and recorded the head micromovements while showing the images. A marker was associated with images (e.g., stimulus) associated with a particular potential intention. A determination was made as to whether the burning lab pictures were associated to lower number of head micromovements which would indicate a recognition of their malicious intention toward that space. If the number of head micromovements stays near the baseline during the showing of images of a person studying or meeting someone in the lab, it means a participant has good intentions of access that should result in access request being granted.

Group 2 participants were informed that an important email was sent to all students by the academic advisor requesting updates to their information to streamline the registration of courses process for the next semester, and in an hour the system would stop accepting any responses, which would result in problems in their registration. Participants were told that this required a wired access to the network for updating personal information. The participants were told that they would be provided access to the personal system only if they did not access a folder named "Personal." The Personal folder contained private pictures, bank username and password information, government critical information and diary. Participants were shown the folders and were told not to access any of the files, as a condition to providing the participants with the laptop to update their information. Participants were asked to aim to open one file securely and read or view its content when provided with the laptop without revealing which file they opened. Once the participants formed an intention to open a file in a particular folder, data collection for the experiment began.

In order to know what file a participant has opened, a HyperCam™ [41] was used, which records what a participant does while using the laptop. The main reason of asking participants not to reveal the file they have in mind and that they intend to access is to address the psychological aspect of committing a wrongful act and needing to conceal their intention, thereby simulating a real scenario.

For the G1 participants, participants were placed in a scenario to have a malicious intent (e.g., setting a lab on fire). This intention is not an intention that they formed themselves, but rather was an intention that they did not want to do but were requested to do. This is an extrinsic intention and is accompanied with hesitation and should result in low number of head micromovements as compared to a baseline number of head micromovements. the baseline. For G2 participants, participants were placed in a scenario in which they would be granted legitimate access to a computer. This setup simulated a real-life scenario of an employee getting access to a data repository. By asking the participants not to open a folder named "Personal", a simulation of a forbidden activity was created. Nonetheless, the participants were able to conduct an action associated with the forbidden activity. The participants in G2 were subjected to a scenario where they may abuse a privilege (e.g., insider threat to an organization). By notifying what files existed in the Personal folder, the participants were provided with details of what they can do and to what files.

This also simulates a real insider threat scenario as insiders know the valuable information in an organization. Finally, by informing participants that if they open one of the private files and get caught, the experiment was stopped, and a simulation on what actions an employee is informed not to do while signing their employment contract and what consequences they may encounter if they do perform such a breach was created.

In the present experiment, head micromovements were measured using a gyro sensor that is embedded in the EMOTIV™ EPOC™, which is a small MEMS chip with full-scale range of 500°/s on each axis. MEMS chip is a two-axis rotational accelerometer that measures the acceleration on each axis over the duration of each sample that is 128 times per second. While the utilized sensor is mounted on the head, the test could be carried out by measuring the head micromovements from remote using a laser or a highly sensitive to movement camera.

Participants completed the experiment using a custom system developed to deploy the test and gather the responses from the participants. Participants are first introduced to EPOC™ before being fitted with one. The setup was tested (for about 1 minute) to ensure that there was a sufficient/strong signal. The micromovement data was collected at two times during the experiment: during a baseline and during a time when stimuli was presented to the respective participants. The baseline and reading of stimuli session was timed to record precisely for one minute.

In a quiet environment, participants read the instructions of the experiment that asked them to think of burning a lab (group 1 participants) and access a personal file (group 2 participants). Then the baseline micromovement data was detected and recorded for one minute. During the baseline micromovement data collection stage, participants were asked to relax and were shown a blank or black display screen. It was ensured that there was no reflection on the display screen. After that, 64 image-based stimuli flashed on the display screen, where 16 stimuli were from a target category. The images from the target category reflected the user's intention. Further, 48 stimuli from a non-target category were also provided on the display screen.

For G1, images representing the target stimuli included random pictures of fire, burning papers and burning books. Non-target stimuli included random pictures of a university campus, labs and students.

For G2, images representing existing files in the Personal folder were shown. Each image was displayed for 1 second, and the session duration was 64 seconds. No delays between stimulus were used. The pattern of flashed stimuli included 3 images from a non-target category and 1 image from a target category (e.g., photos of a burning lab, burning books, etc. for group 1 and photos of a message to open private message/photos, etc. for group 2). Each stimulus flashed only once during the session. Target/Non-target based markers were automatically sent to a Testbench™, the EMOTIV™ EEG collection system, for the analysis. Event markers were sent using the PortWriter program that sends commands from a COM port to another com0com program is used to create and map two virtual COM ports together.

Afterwards, raw data were exported from Testbench and converted from the European Data Format (EDF) to raw CSV files. For the head micromovement analysis, only CSV file columns number 34 as the X-axis, 35 as the Y-axis and 36 as the event marker data were extracted. Columns 34 and 35 were divided into two categories based on column 36, intended or non-intended action, and then imported to MATLAB™. The remaining 1-33 columns were not used as they include EEG data.

To illustrate, the following is a select portion of an example raw CSV file including data columns for X-axis, Y-axis, and potential indication (e.g., associated with target stimulus presented to the user under test) associated with the X-axis and Y-axis data:

| X-axis Data | Y-Axis Data | Potential Intention |
|---|---|---|
| 1700 | 1711 | 1 |
| 1699 | 1713 | 1 |
| 1697 | 1712 | 1 |
| 1701 | 1711 | 1 |
| 1700 | 1713 | 1 |
| 1698 | 1711 | 1 |
| 1699 | 1712 | 1 |

It may be appreciated that data columns above may contain numerous additional rows of data, where there may be 128 rows per second (e.g., for a movement detection sensor operating at 128 samples per second). Beginning at X-axis data value 1699, the corresponding Y-axis data values transition from an "UP" micromovement to a "DOWN" micromovement to a "DOWN" micromovement, and to an "UP" micromovement (e.g., 1713, 1712, 1711, 1713 in bold font). The above highlighted y-axis data micromovements may be counted as one occurrence of an "up-down-down-up" micromovement pattern for "intention 1". The embodiment systems described herein may filter or process the data columns for determining the number of instances of the micromovement pattern that is being examined for a given time period. The number of detected sequences of the micromovement pattern may be recorded as a frequency value for that given time period. As described in some examples herein, the systems described herein may determine changes to micromovement patterns for determining whether a user has a potential intention and whether the user has a high or low motivation to conduct an action associated with the potential intention. Although the above example describes identifying occurrences of micromovement patterns for "intention 1", the system may conduct operations for identifying occurrences of micromovement patterns for other intentions. The CSV file containing micromovement data may include data associated with a second target stimulus presented to the user under test (e.g., intention 2).

In some embodiments, MATLAB code for identifying an up-down-down-up micromovement pattern for y-axis data may be provided as follows:

if (y1(j)<y1(j+1)&&y1(j+1)>y1(j+2)&&y1(j+2)>y1(j+3)&&y1(j+3)<y1(j+4))
    Intention1=Intention1+1; // to add the number of occurrences of the pattern for intention 1
if (y2(j)<y2(j+1)&&y2(j+1)>y2(j+2)&&y2(j+2)>y2(j+3)&&y2(j+3)<y2(j+4))
    Intention2=Intention2+1; // to add the number of occurrences of the pattern for intention 2

Although the above sample MATLAB code may be used for y-axis micromovement data, the MATLAB code may be revised for x-axis micromovement data. Further, the above sample MATLAB code may be used for identifying a particular micromovement pattern (e.g. a sequence of micromovements); however, the MATLAB code may be revised for identify other micromovement patterns, such as Down-Up-Down, or other patterns.

The above sample MATLAB code can provide a count of a number of occurrences for the respective intentions (e.g., intentions associated with stimulus presented at the time of data acquisition). The number of determined occurrences of a micromovement pattern for respective intentions can be used for determining whether a user has a potential intention and the likelihood the user may conduct an action associated with the identified potential intention.

Several patterns were used to calculate the number of micromovements. The comparison was done between X-axes in both categories, Y-axes in both categories, X-axes, and Y-axes in both categories. Patterns are applied to all participants to elect the best method.

Pattern 1: was to compare no movements, in X-axes and no movement in Y-axes.

Pattern 2: was to compare all movement changes, in X-axes and in Y-axes.

Pattern 3: was to compare the movements of Right-Left-Right, in X-axes and Up-Down-Up in the Y-axes.

Pattern 4: was to compare the movements of Left-Right-Left, in X-axes and Down-Up-Down in the Y-axes.

Pattern 5: was to compare the movements of Right-Left-Left-Right, in X-axes and Up-Down-Down-Up in the Y-axes.

Pattern 6: was to compare the movements of Left-Right-Right-Left, in X-axes and Down-Up-Up-Down in the Y-axes.

The event category that showed a lower number of head micromovements than the baseline were then identified as being associated with the intended action.

Several patterns to calculate the number of micromovements were tested. The comparison was done between X-axes in both categories target and non-target, Y-axes in both categories, X-axes, and Y-axes in both categories. Patterns were applied to all participants to select the best method.

After reviewing the micromovement data for all the patterns, the shared discriminative pattern of the two categories of stimuli was "pattern 5" in the Y-axes that states a micromovement of Up-Down-Down-Up to be less frequent in the target category and more frequent in the non-target category. In the present example, the other patterns did not illustrate any discernible conclusions. The analysis of each category was taken for the first 4 seconds in each category to simulate a real life scenario of authentication time. This results in 512 variations of movements in each category.

Referring again to FIGS. 3A and 3B, the head micromovement plots depict the X-axes and Y-axes micromovement without applying a filter when viewing intended vs. non-intended actions that is represented in visual stimuli. The plots show that the participant was focusing on the screen and not voluntarily moving their head as the most movement was 9 steps movement in the Y-axes for the whole session while each movement is done in 1.28 ms.

Referring again to FIG. 4, the head micromovement plot depicts the X-axes and Y-axes movement after applying a "pattern 5" filter, Up-Down-Down Up, which reduced the number of steps to 6 steps and illustrates a lower number of movements when viewing the intended action vs. when viewing the non-intended action.

The gyroscope sensor was a small MEMS chip with full-scale range of 500°/s on each axis records 128 micro movements per second and there was no significant or slightly movement since a significant movement is represented by a number of micromovements, a number of slightly movements, with a significant movement to UP for one second, the pattern would be UP for 128 times. Therefore, the threshold for the pattern to determine the direction of movement is each recorded movement that is 128 recorded micromovement per second. In this case no pattern can be similar to another and differentiation between the patterns can be made.

In the examples described herein, the number of micromovements or frequency of micromovement patterns may not only allow a system to determine the motivation towards an intention, but may also allow the system to determine what the intended action based on lower micromovements when compared with the rest of tested possible intentions.

Upon determining an intention of a user, the system may assign a risk value or score to the determined intention. The assigned risk value or score may be provided by a resource or asset owner, such that the risk value or score may be associated with loss value associated with threats or malicious intentions.

In some embodiments, an example risk value or score may be calculated using equation 2 (below). The motivation level may be associated with a number of micromovements when viewing a stimulus of a targeted intention and may be divided by 10. Motivation level may be treated as the probability of an intention being executed and the intent category value as 90% for testing purposes.

$$R = \frac{(\text{Motivation level} * \text{Intention category value})}{100} \quad (2)$$

Figure 5:
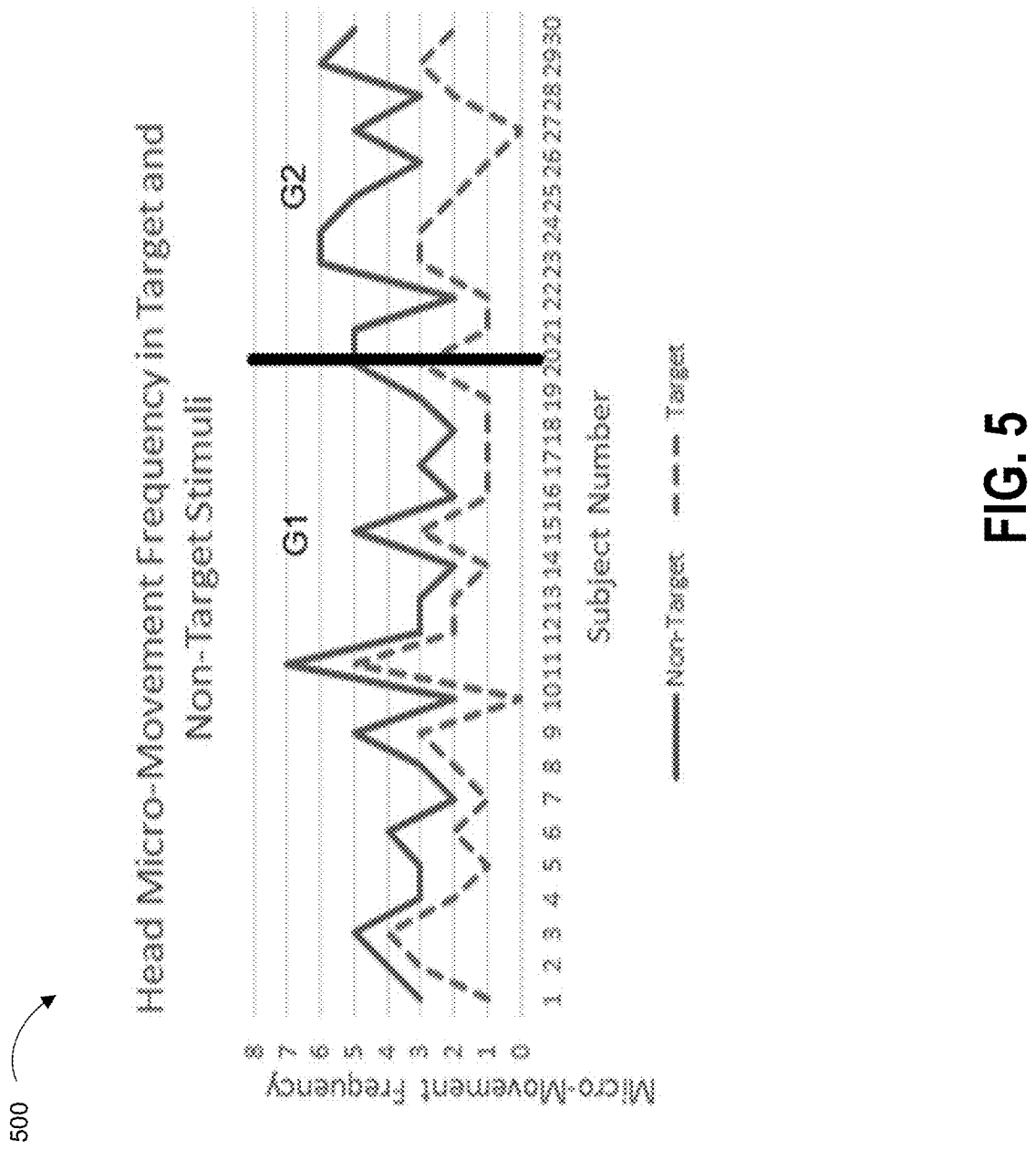
FIG. 5 illustrates a plot of frequency data associated with head micromovement data for a number of participants in an experiment, in accordance with an embodiment of the present application.

Reference is made to FIG. 5, which illustrates a plot of frequency data 500 associated with head micromovement data for a number of participants in the above-described experiment, in accordance with an embodiment of the present application. The head micromovement data plot includes a frequency for a head micromovement pattern associated with a non-target stimuli and a target stimuli for each of the participants in group 1 and group 2.

The frequency for the head micromovement pattern associated with the target stimuli may be stimulus (e.g., photos, acoustic sounds, etc.) associated with a potential intention. The frequency for the head micromovement pattern associated with the non-target stimuli may be any other stimuli not associated with the potential intention. In some embodiments, the frequency for the head micromovement pattern may be a baseline frequency of head micromovement pattern, such that a system for intent-based access control may identify changes in frequency of head micromovement patterns.

In FIG. 5, the frequency for the respective head micromovement patterns associated with non-target stimuli presented to participants are greater than the frequency for the respective head micromovement patterns associated with target stimuli presented to the participants. Accordingly, the system for intent-based access control described in the present application may identify a potential intention of a user by analyzing changes in head micromovement patterns upon presenting the user with a target stimuli associated with that potential intention. For instance, as illustrated in FIG. 5, when the respective participants were presented with a target stimulus (e.g., photos of burning objects (group 1) or photos of messages asking the participant to access private files (group 2)), the target stimulus may trigger surprise and/or fear in the respective participants. Such internalized surprise and/or fear may have caused the respective participants to pay more attention to the presented stimulus, thereby resulting in an involuntary decrease in head micromovements or decrease in frequency of head micromovement patterns.

A two-tailed paired samples for means t-test uncovers that the number of occurrences of the pattern (Up-Down-Down-Up) of head micromovements when viewing Target stimuli (mean=1.9, standard deviation=1.15) compared to the number of head occurrences of micromovements when viewing Non-target stimuli (mean=3.83, standard deviation=1.46, $p \leq 0.0001$). Analysis of Variance (ANOVA) also suggests a difference between the Target and Non-Target micromovements between the two groups with $p<0.0001$. It may be appreciated that the t-test, described above, may be a type of inferential statistics to determine whether there is a significant difference between the means (average) of two groups. That is, a paired sample t-test may be a statistical procedure used to determine whether the mean difference between two sets of observations is zero. In a paired sample t-test, each subject or entity may be measured twice, resulting in pairs of observations. In some other examples, other types of inferential statistics may be used for describing examples of the present application.

As illustrated in the above-described experiment of participants, participants may involuntarily exhibit a lower number or lower frequency of head micromovements when the participants are presented with a target stimuli associated with a potential intention to conduct an action, as compared to participants presented with a non-target stimuli not associated with any potential intention to conduct an action. In some embodiments, comparison of head micromovements for identifying potential intention of participants may be made based on a head micromovement pattern associated with micromovements having a sequence of Up-Down-Down-Up movements.

Referring still to FIG. 5, micromovement data for both group 1 and group 2 participants is illustrated. As described above, participants 1 to 20 (group 1) were provided with an extrinsic intention (e.g., hesitation-based). Thus, the group 1 participants may have formed the extrinsic intention to conduct an action associated with the extrinsic intention; however, the group 1 participants may not be motivated to conduct the action associated with the extrinsic intention. Participants 21 to 30 were provided with an intrinsic intention (e.g., motivation-based). Thus, the group 2 participation may have formed the intrinsic intention themselves and may be highly motivated to conduct an action associated with the intrinsic intention.

In FIG. 5, the difference between the baseline frequency of a head micromovement pattern (e.g., associated with the non-target stimuli) and the stimulated frequency of a head micromovement pattern is generally larger for the group 2 participants (e.g., having an intrinsic intention—high motivation) than for the group 1 participants (e.g., having an extrinsic intention—low motivation).

A two-tailed paired samples for means t-test uncovers that the number of occurrences of the pattern (Up-Down-Down-Up) of head micromovements when viewing Target stimuli in the G1, hesitation-based, (mean=0.15, standard deviation=0.05) compared to the number of head occurrences of micromovements when viewing Target stimuli in G2, Motivation-based (mean=0.28, standard deviation=0.12, $p \leq 0.0001$. Analysis of Variance (ANOVA) also suggests a difference between the micromovements between the two groups with $p < 0.0001$.

As described herein, a motivation score may be associated with a likelihood of a potential intention associated with a target stimulus being undertaken by a participant. For example, a frequency of head micromovement for a participant having an implicit intention (e.g., high motivation to undertake an action associated with the implicit intention) is relatively lower than a frequency of head micromovement for a participant having an explicit intention (e.g., low motivation to undertake an action associated with the implicit intention). Accordingly, in some embodiments, a motivation (or motivation score) may be quantified as proportional to a difference between the stimulated frequency and the baseline frequency of head micromovement or head micromovement patterns.

Figure 6:
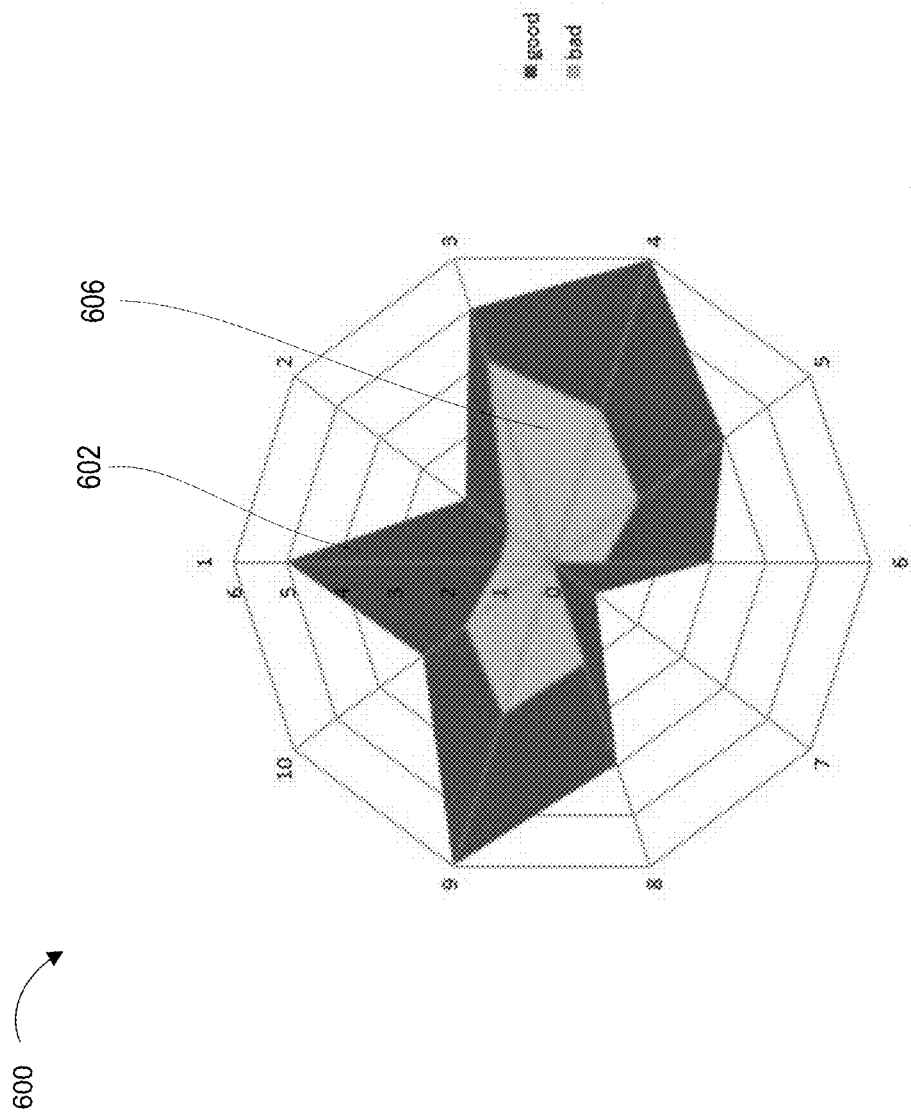
FIG. 6 illustrates a head micromovement data plot illustrating a comparison of head micromovement frequency when respective participants are presented with non-target and with target stimuli, in accordance with an embodiment of the present application.

Reference is made to FIG. 6, which illustrates a head micromovement data plot 600 that illustrates a comparison of non-stimulated head micromovement frequency 602 when respective participants may be presented with non-target (e.g., good) stimuli and stimulated head micromovement frequency 606 when respective participants may be presented with target (e.g., bad) stimuli, in accordance with an embodiment of the present application. Similar to the example micromovement data illustrated in FIG. 5, FIG. 6 illustrates that a micromovement pattern frequency for the respective participants (participants 1 to 10) is lower when a participant is provided with target stimuli associated with a potentially malicious action than when a participant is provided with a non-target stimuli associated with a non-malicious action.

Figure 7:
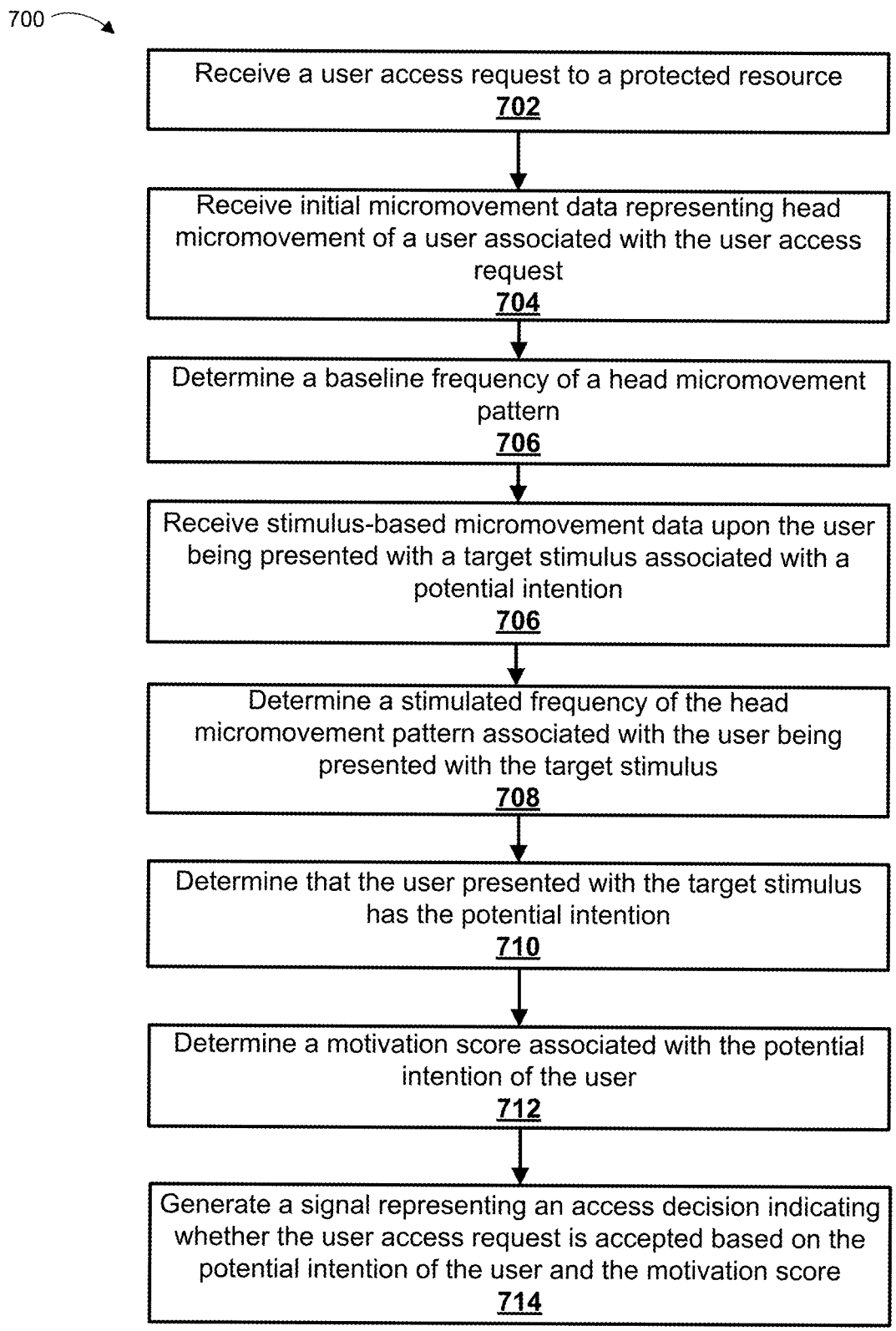
FIG. 7 illustrates a flowchart of a method of intent-based access control, in accordance with another embodiment of the present application.

Reference is made to FIG. 7, which illustrates a flowchart of a method 700 for intent-based access control, in accordance with an embodiment of the present application. The method 700 may be conducted by the processor 112 (FIG. 1) of the system 100 (FIG. 1). The method 700 may include instructions of the access control application 116 (FIG. 1) or any other processor readable instructions stored in the memory 114 (FIG. 1) of the system 100.

The intent-based access control method may be provided in a number of scenarios. To highlight features, a non-limiting example will be described along with features of the method 700. A target stimulus may be a uniformed security guard that may be instructed to walk within view of a user. For instance, the target stimulus may be associated with a potential intention, such as shoplifting. The user may be requesting access to a jewelry store and may be requesting access at an entrance way of the jewelry store or requesting access to handle a product locked within a glass jewelry case. In some examples, a non-target stimulus may be a view of the environment without the security guard. In some examples, the target stimulus may be provided on a display screen located at the entrance way of the jewelry store and the target stimulus may be a series of photos depicting weapons or images of a person stealing products.

In the present example, the movement detection sensor may be an image capture device configured to detect and capture micromovement data of the user. In some examples, the movement detection sensor may detect head micromovement of the user. It may be appreciated that the movement detection sensor may be other types of sensors, such as laser devices configured to detect micromovement or gyroscope sensors held or worn by the user.

At operation 702, the processor may receive a user access request to a protected resource. In the present example, the protected resource may be the jewelry store (e.g., a physical space). The user access request may be provided as a buzzer signal, an access request message, or the like.

At operation 704, the processor receives, from the movement detection sensor, initial micromovement data representing head micromovement of a user associated with the user access request. The initial micromovement data may represent head micromovement of the user when the user is presented with non-target stimuli. The non-target stimuli may be displayed photos of a peaceful lake (e.g., photos depicting objects other than objects that may be associated with shoplifting).

At operation 706, the processor determines, based on the initial micromovement data, a baseline frequency of a head micromovement pattern. The head micromovement pattern may include a sequence of involuntary head micromovements of the user associated with the user access request. The processor may determine a user intent based in part on the baseline frequency of the head micromovement pattern. That is, the baseline frequency may be the reference point for evaluating any changes in head micromovements upon the user being presented with a target stimulus associated with a potential intention.

In the present example, the baseline frequency of the head micromovement pattern may be associated with the user being presented with a view that does not include the uniformed security guard or photos depicting persons shoplifting or committing crimes.

Once a baseline frequency of head micromovement pattern is determined, the method may include presenting to the user the target stimulus. The target stimulus may include a uniformed security guard walking within the view of the user or may include a display device presenting a series of photos illustrating persons committing a crime or shoplifting. The target stimulus may be associated with a potential intention of shoplifting or injuring a shop-keeper.

At operation 706, the processor receives, from the movement detection sensor, stimulus-based micromovement data representing head micromovement upon the user being presented with the target stimulus associated with the potential intention.

At operation 708, the processor determines, based on the stimulus-based micromovement data, a stimulated frequency of the head movement pattern associated with the user being presented with the target stimulus. To illustrate, when the target stimulus is presented to the user for 1 second, micromovement data associated with head micromovement of the user may be received and, the processor may apply a pattern filter to the micromovement data for identifying a number or frequency of the micromovement pattern (e.g., up-down-down-up micromovement pattern being sought). It may be appreciated that micromovement data associated with a threshold period of time upon the target stimulus being presented may be most relevant. For example, micromovement data associated with the first second upon the target stimuli being presented may be most representative for deducing the user intention, in contrast to micromovement data associated with two seconds (and onwards) after the target stimuli is presented to the user. The user may be most adept to exhibit changes in involuntary micromovement behavior (e.g., "fight, flight, and freeze" response) upon the initial time duration after being presented with the target stimuli.

In some embodiments, the processor may filter the initial micromovement data and the stimulus-based micromovement data to identify micromovement data representing the head micromovement pattern. For example, the head micromovement pattern may be a sequence of involuntary head micromovements of the user associated with the user access request. In some embodiments, the head micromovement pattern may include a sequence of up-down-down-up movements detected about a y-axis of the movement detection sensor.

It may be appreciated that some embodiments described herein include head micromovement data and patterns; however, micromovement data and patterns may also be associated with other portions of the user's body. Further, the head micromovement pattern including the sequence of up-down-down-up movements is illustrative. In some other embodiments, the head micromovement pattern may include any other sequences of movements.

At operation 710, the processor may determine whether the user presented with the target stimulus has the potential intention based at least on the baseline frequency and the stimulated frequency of the head micromovement pattern. In a scenario where the user may have an intention to conduct a robbery or to steal products from the jewelry store, the processor may determine that the user presented with a view of the uniformed security guard has the potential intention of shoplifting. In the present example, the processor may determine that the stimulated frequency of the head micromovement pattern may be lower than the baseline frequency of the head micromovement pattern.

In the present example, the processor may determine that the user has the potential intention based on the theoretical foundation that micromovement patterns may change when a user is presented with a target stimulus (e.g., view of a uniformed security guard within the jewelry store) that is associated with a concealed intention of shoplifting.

At operation 712, the processor may determine a motivation score associated with the determined potential intention of the user based on the stimulated frequency relative to the baseline frequency of the head micromovement pattern. The motivation score may indicate a likelihood that the user executes the potential intention.

As described herein, a user having an extrinsic intention (e.g., intention imposed on them) may have a low motivation and, thus, a lower likelihood of conducting an action associated with the determined potential intention. In contrast, a user having an intrinsic intention (e.g., intention formulated by the user) may have a high motivation and, thus, a higher likelihood of conducting an action associated with the determined potential intention.

In some embodiments, the motivation score may be quantified as proportional to a difference between the stimulated frequency and the baseline frequency of the head micromovement pattern. To illustrate, referring again to FIG. 5, the difference between a stimulated frequency and a baseline frequency of a head micromovement pattern for a user with an intrinsic intention (group 2 participants) is generally larger than the difference between a stimulated frequency and a baseline frequency for a user with an extrinsic intention (group 1 participants). Thus, in some embodiments, the motivation score may be determined based, at least in part, on whether the difference between a stimulated frequency and the baseline frequency is greater than a threshold range or value. The threshold range or value may be based on statistical data analysis of captured micromovement data of numerous users who may have been presented with stimuli in a similar environment or scenario.

At operation 714, the processor may generate a signal representing an access decision indicating whether the user access request is accepted based on the potential intention of the user and the motivation score. The signal representing the access decision may be transmitted to a protected resource controller. Continuing with the present example, the protected resource controller may be coupled to an actuator of a jewelry case where a product may be secured. In some embodiments, the signal representing the access decision may be a voltage signal that may trigger a servo, motor, latch, or the like within the actuator to transition from a first position to a second position. Other example signals representing the access decision may be contemplated. Other examples of protected resource controllers coupled to other devices associated with protected resources may be contemplated.

In the scenario where the access decision indicates that the user access request is accepted, the jewelry case may be unlocked. When the access decision indicates that the user access request is accepted, the processor may have determined that (1) the user may not have the potential intention; or (2) the user may have the potential intention, but the motivation score may indicate that there is a low likelihood that the user may conduct a shoplifting action (e.g., extrinsic intention or the difference between the baseline frequency and the stimulated frequency of the head micromovement pattern may be relatively small).

In the scenario where the access decision indicates that the user access request is denied, the jewelry case may remain locked. When the access decision indicates that the user access request is denied, the processor may have determined that (1) the user has the potential intention associated with the target stimulus; and (2) the motivation score may indicate that there is a relatively high likelihood that the user may conduct the shoplifting action. A threshold for identifying there to be a high likelihood that the user may conduct the shoplifting action may be predetermined by an asset owner or may be determined based on prior statistical analysis of micromovement data. In some examples, the motivation score may be quantified as a proportional difference between the stimulated frequency and the baseline frequency of the head micromovement pattern. In some embodiments, thresholds may be iteratively determined based on machine learning operations or systems.

In another illustrating example, a user under test may be asked to obtain a document stored within a safe. The subject document and a gold bar may be stored within the safe. An example system for intent-based access control may be configured to detect the intention of the user under test and determine whether access may be granted to the safe.

In the present example, intention 1 may be associated with an intention to retrieve the subject document (e.g., categorized as a 0 points problem). Intention 2 may be associated with unauthorized removal of the gold bar from the safe (e.g., categorized as a 100 points problem). The system may capture image data (e.g., receive image data via an image capture device) for detecting user head micromovement when presented with target stimuli. The system may detect a baseline micromovement frequency of 11 instances per time period. Further, the system may present acoustic stimuli to the user and may detect user head micromovement when the user is asked questions.

In the present example, the system may detect a first intention micromovement frequency of 12 instances per time period when asked about retrieving the document from the safe and may detect a second intention micromovement frequency of 2 instances per time period when asked about retrieving the gold bar from the safe. Based on the micromovement frequency data, the system may determine that the user under test may have an intention to conduct an action of removing the gold bar from the safe without authorization. The system may determine that there is a 90% chance (or motivation measure) (e.g., 11 instances minus 2 instances) that the user may conduct the action associated with the second intention. The system may determine a risk score as 0.9×100=90% (e.g., motivation×intent value=−0.9× 100=90%). Accordingly, in an example where the system may be configured with a threshold risk value of 25%, the system may determine that access not be granted to the user, as the system may determine that there is a 90% risk that the gold bar may be removed without authorization if access is granted to the safe.

Referring again to the example experiment associated with the head micromovement frequency data plots of FIG. 5, the systems and methods for intent-based access control based on micromovement data may be compared to the above described IBAC system [1] that relies upon physiological measurements, such as EEG signals of a user's brain.

The total risk in the physiological-based IBAC model suggest a value of 90% in the intent category and the value of the signal amplitude as the motivation levels to compute the total risk. The paper [1] showed a 100% accuracy level of preventing insiders from gaining access to protected resources. In some embodiments described herein, the approach aims for the same recourse and therefore the intent category is 90% and the motivation levels is calculated as the difference of micromovements when viewing Target (intended action) stimuli and the Non-target (non-intended action) stimuli.

Figure 8:
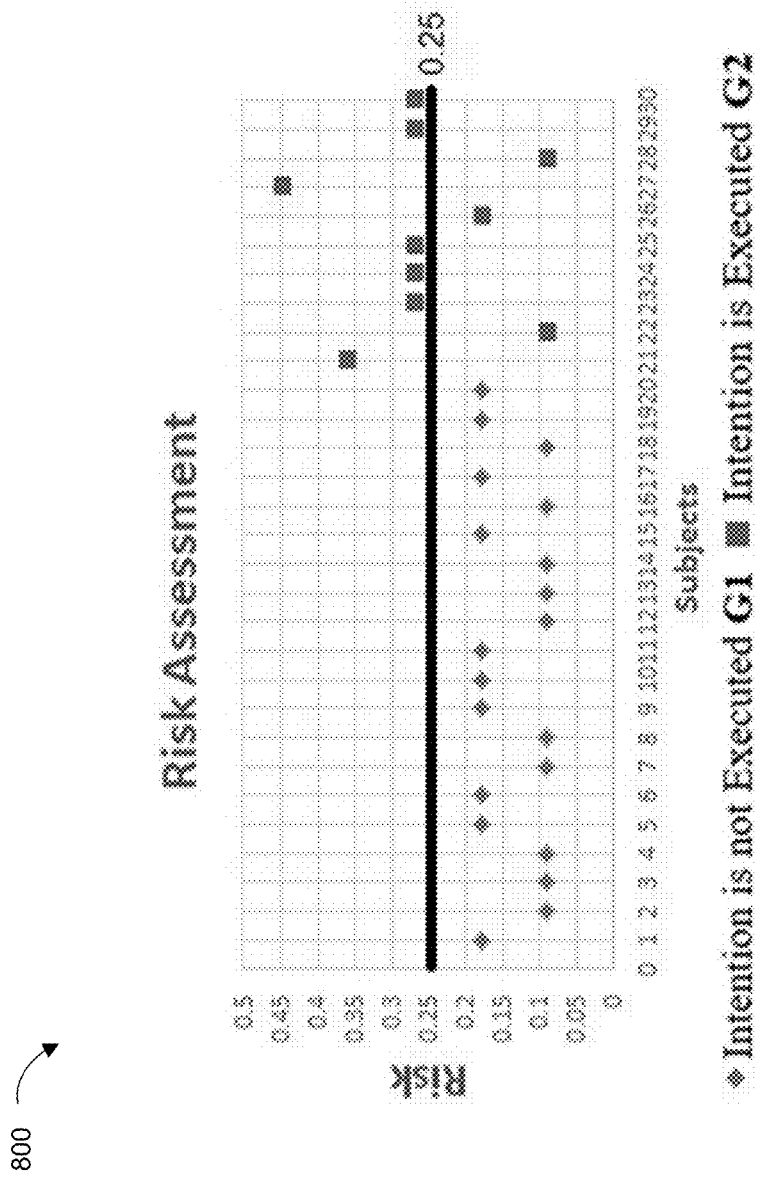
FIG. 8 illustrates a risk score data plot, in accordance with an embodiment of the present application.

To illustrate, reference is made to FIG. 8, which illustrates a risk score data plot 800 for the participants of group 1 and group 2 (related to the micromovement data illustrated in FIG. 5), in accordance with an embodiment of the present application. A two-tailed paired samples for means t-test uncovers that the risk level of G1 when viewing Target stimuli (mean=0.15, standard deviation=0.05) compared to risk level of G2 when viewing Target stimuli (mean=0.28, standard deviation=0.12), $p \leq 0.0001$. Analysis of Variance (ANOVA) also suggests a difference between the risk level in G1 and the risk level in with $p<0.0001$. If the risk level is to be set at 25% as a threshold, the system results in 30% falsely accepted, 100% correctly accepted, 0% falsely rejected and 70% correctly rejected users.

A survey was given to the 30 participants (described in experiments associated with the micromovement data plots of FIG. 5) after completing the experiment that included a question of whether they accept the technology to be deployed where they may work. 24 participants out of 30 selected accept with 80% acceptance level which showed a higher acceptability level when compared with the physiological based IBAC model that only showed 10% acceptability level. The acceptability results of a behavioral approach were expected to be higher than the physiological approach due to the privacy implications biometric related technologies usually face. Especially when comparing a behavioral approach with an EEG-based approach which reveals sensitive and private information, such as bank cards numbers, area of living and passwords [42]. Therefore, the acceptability usually is very low when compared with behavioral methods such as gate, way of walking, voice, etc. When comparing the analysis of EEG signals with the analysis of movements, naturally acceptability gets higher rate. If the physiological measurement was substituted with a behavioral measurement that has a higher acceptability level, the micromovement behavioral measurement is a valid approach to detecting intentions of access and prevent insider threats.

Based on examples described herein, the head micromovement behavior measurement may substitute the physiological measurement in the IBAC model [1] with a higher user acceptance level. The head micromovement measurement may substitute the existing physiological measurement with 70% accuracy of rejecting malicious insiders access to restricted resources but with 80% acceptance rate compared with the current physiological-based IBAC model that reached 100% accuracy of rejecting malicious insiders access to restricted resources but with only 10% acceptance level.

Figure 9:
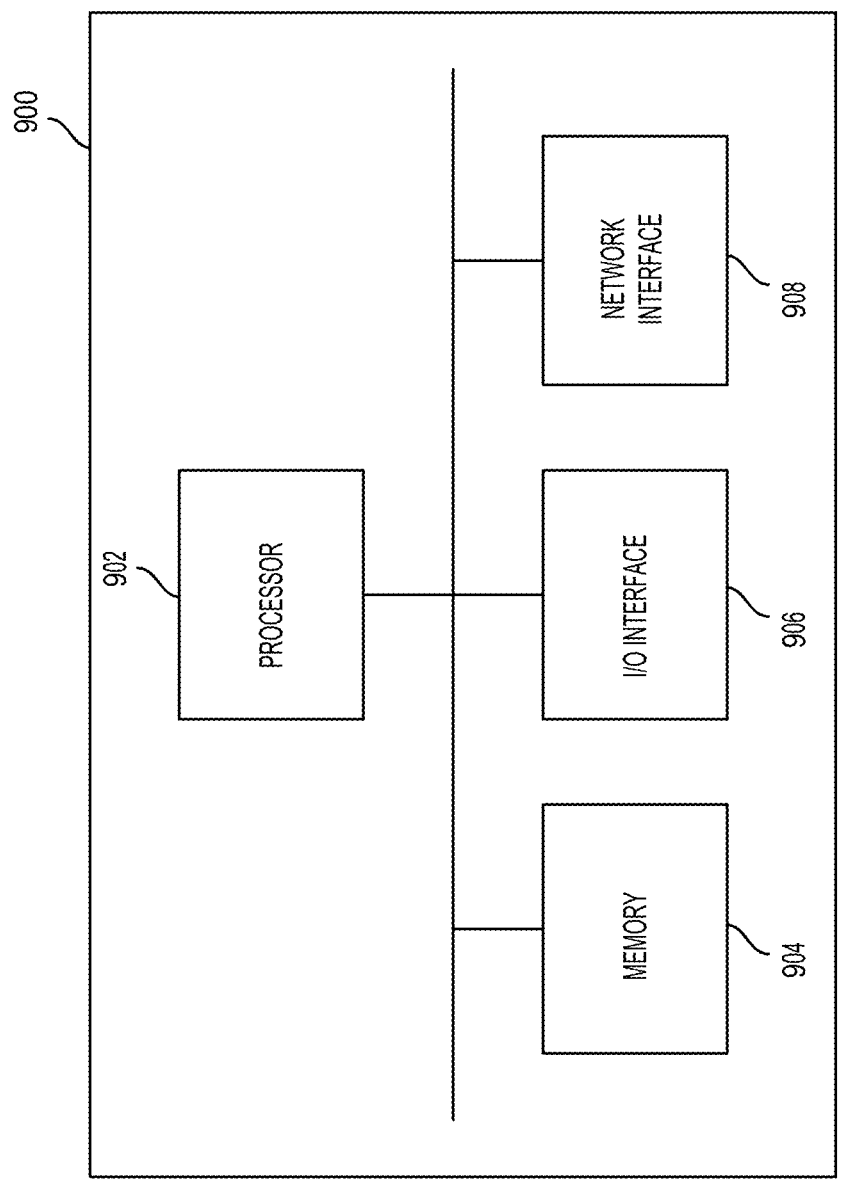
FIG. 9 illustrates a block diagram of a computing device, in accordance with an embodiment of the present application.

Reference is made to FIG. 9, which illustrates a block diagram of a computing device 900, in accordance with an embodiment of the present application. As an example, the system 100 of FIG. 1 may be implemented using the example computing device 900 of FIG. 9.

The computing device 900 includes at least one processor 902, memory 904, at least one I/O interface 906, and at least one network communication interface 908. The computing device 900 may be configured as a system for intent-based access control.

The processor 902 may be a microprocessor or microcontroller, a digital signal processing (DSP) processor, an integrated circuit, a field programmable gate array (FPGA), a reconfigurable processor, a programmable read-only memory (PROM), or combinations thereof.

The memory 904 may include a computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM).

The I/O interface 906 may enable the computing device 900 to interconnect with one or more input devices, such as a keyboard, mouse, camera, touch screen and a microphone, or with one or more output devices such as a display screen and a speaker.

The networking interface 908 may be configured to receive and transmit data sets representative of the machine learning models, for example, to a target data storage or data structures. The target data storage or data structure may, in some embodiments, reside on a computing device or system such as a mobile device.

In some embodiments, there may be processor-executable instructions or software that, when executed, by a processor converts the computing device 900 into a special purpose computing device to perform particular operations pursuant to instructions of the processor-executable instructions.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

As can be understood, the examples described above and illustrated are intended to be exemplary only.

REFERENCES

[1] Almehmadi, A.; El-Khatib, K., "On the Possibility of Insider Threat Prevention Using Intent-Based Access Control (IBAC)," Systems Journal, IEEE, vol. PP, no. 99, pp. 1, 12 doi:10.1109/JSYST.2015.2424677
[2] D. M. Cappelli, A. P. Moore, and R. F. Trzeciak, The CERT Guide to Insider Threats: How to Prevent, Detect, and Respond to Information Technology Crimes (1st ed.). Addison-Wesley Professional, 2012.
[3] Camille Tuutti, "The Insider Threat: A Historical Perspective," Nextgov, Sep. 16, 2016, Available at: "http://www.nextgov.com/cybersecurity/2016/09/insider-threat-historical-perspective/131613/"
[4] Common Sense Guide to Mitigating Insider Threats, 4th Edition, December, 2012. http://www.sei.cmu.edu/library/abstracts/reports/12tr012.cfm
[5] As Cybercrime Threats Continue to Escalate, 2013 State of Cybercrime Survey from PwC and CSO Finds Companies Aren't Doing Enough to Defend Themselves, Available at "http://www.pwc.com/us/en/increasing-it-effectiveness/publications/us-state-of-cybercrime.jhtml"
[6] The CERT Insider Threat Center. Available at: "http://www.cert.org/insider-threat/best-practices/index.cfm"
[7] Future Attribute Screening Technology (FAST) U.S Home Land Security. Available at: "www.dhs.gov/xlibrary/assets/privacy/privacy_pia_st_fast-a.pdf"
[8] Ferraiolo, D. F. and Kuhn, D. R. "Role-Based Access Control" (PDF). 15th National Computer Security Conference. pp. 554-563. 1992.
[9] Wang, J., Takata, Y., Seki, H. "HBAC: A Model for History-Based Access Control and Its Model Checking" Computer Security—ESORICS 2006.
[10] Hur, J., Noh, D., "Attribute-Based Access Control with Efficient Revocation in Data Outsourcing Systems" Parallel and Distributed Systems 2011.
[11] Ma, G., Wu, K., Zhang, T., Li, W., "A flexible policy-based access control model for Workflow Management Systems" Computer Science and Automation Engineering (CSAE), 2011.
[12] McGraw, R., "Risk-Adaptable Access Control(RAdAC)", National Institution of Standards and Technology, Computer Security Division, Available at "http://csrc.nist.gov/news_events/privilege-management-workshop/radac-Paper0001.pdf"
[13] Almehmadi, A, El-Khatib, K, Intention-based Trust Re-evaluation, PST 2016.

[14] McGraw, R., "Risk-Adaptable Access Control(RAdAC)", National Institution of Standards and Technology, Computer Security Division", 2009, Available at "http://csrc.nist.gov/news_events/privilege-management-workshop/presentations/Bob_McGraw. pdf"

[15] B. H. Sheppard, J. Hartwick, and P. R. Warshaw, "The theory of reasoned action: A meta-analysis of past research with recommendations for modifications and future research," Journal of Consumer Research, vol. 15, pp. 325-343, 1988.

[16] B. J. Fogg, "A behavior model for persuasive design," In Proceedings of the 4th International Conference on Persuasive Technology (Persuasive '09). ACM, New York, N.Y., USA, Article 40, 7 pages. DOI=10.1145/1541948.1541999 http://doi.acm.org/10.1145/1541948.1541999, 2009.

[17] Dobson, Michael S., and Deborah S. Dobson. "Chapter 4—Tools for Qualitative Risk Analysis". Project Risk and Cost Analysis. AMACOM. © 2012. Books24x7.

[18] Goodpasture, John. "Chapter 8—Special Topics in Quantitative Management". Quantitative Methods in Project Management. J. Ross Publishing. © 2004. Books24x7.

[19] Office of Government Commerce (OGC), The. "Appendix B—Common Techniques". Management of Risk: Guidance for Practitioners. TSO, Ltd. © 2010. Books24x7.

[20] J. K. Burgoon, "A communication model of personal space violations: Explication and an initial test," Human Communication Research, vol. 4, pp. 129-142, 1978.

[21] a. S. J. A. Green D. M., Signal Detection Theory and Psychophysics: New York: Wiley, 1966.

[22] Zolfagharifar, E., Scared stiff: Scientists discover how the brain sends signals to make us 'freeze' when faced with danger, DailyMail, April 2014, Available at: http://www.dailymail.co.uk/sciencetech/article-2612117/Scared-stiff-Scientists-discover-brain-sends-signals-make-freeze-faced-danger.html.

[23] Várszegi, L. "Comparison of algorithms for detecting hand movement from EEG signals," IEEE International Conference on Systems, Man, and Cybernetics (SMC), 2016.

[24] Noguchi, K., Somwong, P., Matsubara, T., "Human intention detection and activity support system for ubiquitous autonomy, IEEE International Symposium on Computational Intelligence in Robotics and Automation, 2003. Proceedings. 2003.

[25] Kirsch, R., and Au, A. "EMG-based motion intention detection for control of a shoulder neuroprosthesis", Engineering in Medicine and Biology Society, 1997.

[26] Lew, E., Chavarriaga, R., Zhang, H., Seeck, M., and Millan, J., "Self-paced movement intention detection from human brain signals: Invasive and non-invasive EEG", Engineering in Medicine and Biology Society (EMBC), 2012

[27] Nakauchi, Y., Nogichi, K., Somwang, P., and Matsubara, T., "Human Intention Detection and Activity Support System for Ubiquitous Sensor Room" Intelligent Robots and Systems, 2003. (IROS 2003). 27-31 Oct. 2003

"nemesysco" Voice analysis technology. "www.nemesysco.com"

[29] Elkins, A., Burgoon, J., and Nunamaker, J., "Vocal Analysis Software for Security Screening: Validity and Deception Detection Potential," Homeland Security Affairs. Available are http://www.hsaj.org/?special:fullarticle=0.4.1.

[30] Burgoon, J., Adkins, M., Kruse, J., Jensen, M., Meservy, T., Twitchell, D., Deokar, A., and Nunamaker, J., "An Approach for Intent Identification by Building on Deception Detection", System Sciences, 2005. HICSS '05. Proceedings of the 38th Annual Hawaii International Conference, 2005.

[31] Chen, H., Chung, W., Qin, J., Reid, E., Sageman, M., Weimann, G., "Uncovering the dark Web: A case study of Jihad on the Web" in Journal of the American Society for Information Science and Technology, vol. 59 Issue 8, June 2008.

[32] Raghu, T., Chen, H., "Cyberinfrastructure for homeland security: Advances in information sharing, data mining, and collaboration systems" in Journal: Decision Support Systems—DSS, vol. 43, no. 4, pp. 1321-1323, 2007.

[33] Memon N., Hu, J., Hicks, D., Chen, H., "Social Network Data Mining: Research Questions, Techniques, and Applications", I: Data Mining for Social Network Data. red./N.h Memon; J. Xu; D. Hicks; H. Chen. Vol. 12 Springer Publishing Company, 2010, pp. 1-7.

[34] Memon, N., Larsen, H., Hicks, D. and Harkiolakis, N., "Detecting Hidden Hierarchy in Terrorist Networks: Some Case Studies", Intelligence and Security Informatics, Springer, pp. 477-489, 2008.

[35] Vybornova, O., Smirnov, I., Sochenkov, I., Kiselyov, A., Tikhomirov, I., Chudova, N., Kuznetsova, Y., Osipov, G., "Social Tension Detection and Intention Recognition Using Natural Language Semantic Analysis: On the Material of Russian-Speaking Social Networks and Web Forums," Intelligence and Security Informatics Conference (EISIC), 2011 European, September 2011.

[36] S. Dong, S. Lee, "Understanding human implicit intention based on frontal electroencephalography (EEG)," in Neural Networks (IJCNN), The 2012 International Joint Conference on, vol., no., pp. 1-5, 10-15 Jun. 2012

[37] J. Rosenfeld, X. Hu, E. Labkovsky, E. Meixner, and M. Winograd, "Review of recent studies and issues regarding the P300-based complex trial protocol for detection of concealed information," International Journal of Psychophysiology, November 2013.

[38] J. Meixner and P. Rosenfeld, "A mock terrorism application of the P300-based concealed information test," Society for Psychology Research, Wiley 2010.

[39] Holten, R., "Wiling, Wanting, Waiting," Oxford UP, 2009, "http://web.mit.edu/holton/www/pubs/bookpdf"

[40] Seltzer, L., Trauma and the Freeze Response: Good, Bad, or Both?, psychologytoday, July 2015, Available at: https://www.psychologytoday.com/blog/evolution-the-self/201507/trauma-and-the-freeze-response-good-bad-or-both

[41] HyperCam, "http://hypercam.en.softonic.com/".

[42] Martinovic, I., Davies, D., Frank, M., Perito, D., Ros, T., and Song, D., "On the feasibility of side-channel attacks with brain-computer interfaces," In Proceedings of the 21st USENIX conference on Security symposium (Security '12). USENIX Association, Berkeley, Calif., USA, 34-34, 2012.

What is claimed is:

1. A system for intent-based access control comprising:
   a movement detection sensor;
   a processor coupled to the movement detection sensor; and
   a memory coupled to the processor storing processor-executable instructions that, when executed, configure the processor to:

receive a user access request to a protected resource;
receive, from the movement detection sensor, initial micromovement data representing head micromovement of a user associated with the user access request;
determine, based on the initial micromovement data, a baseline frequency of a head micromovement pattern, the head micromovement pattern including a sequence of involuntary head micromovements of the user associated with the user access request;
receive, from the movement detection sensor, stimulus-based micromovement data representing head micromovement upon the user being presented with a target stimulus associated with a potential intention;
determine, based on the stimulus-based micromovement data, a stimulated frequency of the head micromovement pattern associated with the user being presented with the target stimulus;
determine that the user presented with the target stimulus has the potential intention based at least on the baseline frequency and the stimulated frequency of the head micromovement pattern;
determine a motivation score associated with the determined potential intention of the user based on the stimulated frequency relative to the baseline frequency of the head micromovement pattern, the motivation score indicating a likelihood that the user executes the potential intention; and
generate a signal representing an access decision indicating whether the user access request is accepted based on the potential intention of the user and the motivation score, the signal representing the access decision for transmission to a protected resource controller.

2. The system of claim 1, wherein the sequence of involuntary head micromovements of the user associated with the user access request includes a sequence of up-down-down-up movements detected about a y-axis of the movement detection sensor.

3. The system of claim 1, wherein the user presented with the target stimulus has the potential intention when the stimulated frequency of the head micromovement pattern is lower than the baseline frequency of the head micromovement pattern by a threshold value.

4. The system of claim 1, wherein the motivation score is associated with a likelihood of the potential intention associated with the target stimulus being undertaken by the user associated with the access request, and wherein the motivation score is quantified as proportional to a difference between the stimulated frequency and the baseline frequency of the head micromovement pattern.

5. The system of claim 1, wherein the baseline frequency of the head micromovement pattern is associated with the user being presented with a non-target stimulus.

6. The system of claim 1, wherein the movement detection sensor includes at least one of a gyroscope, a laser distance measurement device, or a wave-detecting device, and wherein the movement detection sensor is configured to detect movement at a rate of at least 128 samples per second.

7. The system of claim 1, wherein the movement detection sensor includes an image capture device to capture images for tracking the head micromovement.

8. The system of claim 1, wherein the target stimulus includes at least one of a visual, audible, and olfactory stimulus.

9. The system of claim 1, comprising a stimulus output device coupled to the processor, wherein the stimulus output device provides the target stimulus for presentation to the user associated with the access request.

10. The system of claim 1, wherein the processor-executable instructions, when executed, configure the processor to filter the initial micromovement data and the stimulus-based micromovement data to identify micromovement data representing head micromovement patterns.

11. A computer implemented method of intent-based access control, the method comprising:
receiving a user access request to a protected resource;
receiving, from a movement detection sensor, initial micromovement data representing head micromovement of a user associated with the user access request;
determining, based on the initial micromovement data, a baseline frequency of a head micromovement pattern, the head micromovement pattern including a sequence of involuntary head micromovements of the user associated with the user access request;
receiving, from the movement detection sensor, stimulus-based micromovement data representing head micromovement upon the user being presented with a target stimulus associated with a potential intention;
determining, based on the stimulus-based micromovement data, a stimulated frequency of the head micromovement pattern associated with the user being presented with the target stimulus;
determining that the user presented with the target stimulus has the potential intention based at least on the baseline frequency and the stimulated frequency of the head micromovement pattern;
determining a motivation score associated with the determined potential intention of the user based on the stimulated frequency relative to the baseline frequency of the head micromovement pattern, the motivation score indicating a likelihood that the user executes the potential intention; and
generating a signal representing an access decision indicating whether the user access request is accepted based on the potential intention of the user and the motivation score, the signal representing the access decision for transmission to a protected resource controller.

12. The method of claim 11, wherein the sequence of involuntary head micromovements of the user associated with the user access request includes a sequence of up-down-down-up movements detected about a y-axis of the movement detection sensor.

13. The method of claim 11, wherein the user presented with the target stimulus has the potential intention when the stimulated frequency of the head micromovement pattern is lower than the baseline frequency of the head micromovement pattern by a threshold value.

14. The method of claim 11, wherein the motivation score is associated with a likelihood of the potential intention associated with the target stimulus being undertaken by the user associated with the access request, and wherein the motivation score is quantified as proportional to a difference between the stimulated frequency and the baseline frequency of the head micromovement pattern.

15. The method of claim 11, wherein the baseline frequency of the head micromovement pattern is associated with the user being presented with a non-target stimulus.

16. The method of claim 11, wherein the movement detection sensor includes at least one of a gyroscope, a laser distance measurement device, or a wave-detecting device, and wherein the movement detection sensor is configured to detect movement at a rate of at least 128 samples per second.

17. The method of claim 11, wherein the movement detection sensor includes an image capture device to capture images for tracking the head micromovement.

18. The method of claim 11, wherein the target stimulus includes at least one of a visual, audible, and olfactory stimulus.

19. A non-transitory computer readable medium storing machine interpretable instructions which, when executed, cause a processor to perform steps of a method for providing intent-based access control, the method comprising:

receiving a user access request to a protected resource;

receiving, from a movement detection sensor, initial micromovement data representing head micromovement of a user associated with the user access request;

determining, based on the initial micromovement data, a baseline frequency of a head micromovement pattern, the head micromovement pattern including a sequence of involuntary head micromovements of the user associated with the user access request;

receiving, from the movement detection sensor, stimulus-based micromovement data representing head micromovement upon the user being presented with a target stimulus associated with a potential intention;

determining, based on the stimulus-based micromovement data, a stimulated frequency of the head micromovement pattern associated with the user being presented with the target stimulus;

determining that the user presented with the target stimulus has the potential intention based at least on the baseline frequency and the stimulated frequency of the head micromovement pattern;

determining a motivation score associated with the determined potential intention of the user based on the stimulated frequency relative to the baseline frequency of the head micromovement pattern, the motivation score indicating a likelihood that the user executes the potential intention; and generating a signal representing an access decision indicating whether the user access request is accepted based on the potential intention of the user and the motivation score, the signal representing the access decision for transmission to a protected resource controller.

20. The non-transitory computer readable medium of claim 19 storing machine interpretable instructions which, when executed, cause the processor to perform steps of the method for providing intent-based access control, wherein the sequence of involuntary head micromovements of the user associated with the user access request includes a sequence of up-down-down-up movements detected about a y-axis of the movement detection sensor.

* * * * *